United States Patent [19]
Snelling et al.

[11] Patent Number: 6,058,104
[45] Date of Patent: *May 2, 2000

[54] COMMUNICATIONS WEBS FOR PSTN SUBSCRIBERS

[75] Inventors: Richard K. Snelling, Alpharetta; P. Stuckey McIntosh; John C. W. Taylor, both of Atlanta; Mark Tucker, Norcross, all of Ga.

[73] Assignee: Home Wireless Networks, Inc., Norcross, Ga.

[*] Notice: This patent is subject to a terminal disclaimer.

[21] Appl. No.: 08/843,700

[22] Filed: Apr. 16, 1997

Related U.S. Application Data

[63] Continuation-in-part of application No. 08/709,597, Sep. 9, 1996, Pat. No. 5,805,582, which is a continuation of application No. 08/262,214, Jun. 17, 1994, Pat. No. 5,555,258.

[51] Int. Cl.[7] ...................................................... H04J 15/00
[52] U.S. Cl. ........................... 370/277; 370/259; 370/337; 370/352; 370/347; 455/454; 455/515
[58] Field of Search .................................... 370/277, 259, 370/341, 359, 360, 535, 352, 280, 310, 337, 347; 455/127, 403, 422, 454, 515, 562

[56] References Cited

U.S. PATENT DOCUMENTS

| | | | |
|---|---|---|---|
| 3,949,172 | 4/1976 | Brown et al. | 179/2.5 |
| 4,058,678 | 11/1977 | Dunn et al. | 179/2.5 |
| 4,456,793 | 6/1984 | Baker et al. | 179/99 |
| 4,475,193 | 10/1984 | Brown | 370/124 |

(List continued on next page.)

FOREIGN PATENT DOCUMENTS

| | | | |
|---|---|---|---|
| 2053776 | 4/1993 | Canada | H04K 1/00 |
| 1-16051 | 1/1989 | Japan | H04M 1/00 |
| 1-57860 | 3/1989 | Japan | H04M 3/42 |
| 1-309530 | 12/1989 | Japan | H04B 7/26 |
| 1-309531 | 12/1989 | Japan | H04B 7/26 |
| 2-34046 | 2/1990 | Japan | H04B 7/26 |

(List continued on next page.)

OTHER PUBLICATIONS

"The Cordless Office," *Telecom World* (*U.K.*) Dec. 1991.
Bud, Andrew, "Technologies for Personal Networking in Europe," presented at International Mobile Communications 90: Blenheim Online Ltd., Pinner, Middx, U.K. Jun. 12–14, 1990.
Costello, J., "Look—No Wires", *Office Equipment News*, Nov. 1992, pp. 46–47.

(List continued on next page.)

*Primary Examiner*—Douglas W. Olms
*Assistant Examiner*—Shick Hom
*Attorney, Agent, or Firm*—James L. Ewing, IV; Kilpatrick Stockton LLP

[57] ABSTRACT

Systems for connecting telecommunications infrastructure lines to telephones, handsets, computers, telecopy machines and other end user interfaces or consumer electronics devices in a residence or business. Systems according to the present invention include Network Control Units which form the center of a star topology and which communicate via RF link with Wireless Access Units and handsets. Wireless Access Units feature an interface, such as, for example, a standard telephone jack, for accommodating a telephone, a fax machine, a compute modem or other device. Computers or other devices may also be accommodated by Wireless Access Units having other physical and virtual interfaces, including, for instance, serial ports or network interfaces. The Wireless Access Units may also be digital to accommodate ISDN or any other digital standard. Wireless control/monitoring accessories may also be employed to communicate with the Network Control Unit and provide additional functionality such as entrance monitoring, baby monitoring, HVAC control and other services.

21 Claims, 17 Drawing Sheets

U.S. PATENT DOCUMENTS

| | | | |
|---|---|---|---|
| 4,479,033 | 10/1984 | Brown et al. | 179/2.51 |
| 4,514,594 | 4/1985 | Brown et al. | 179/2.51 |
| 4,523,307 | 6/1985 | Brown et al. | 370/30 |
| 4,658,096 | 4/1987 | West, Jr. et al. | 379/59 |
| 4,675,863 | 6/1987 | Paneth et al. | 370/50 |
| 4,737,975 | 4/1988 | Shafer | 379/58 |
| 4,775,997 | 10/1988 | West, Jr. et al. | 379/58 |
| 4,776,001 | 10/1988 | Murata et al. | 379/62 |
| 4,779,262 | 10/1988 | Avis et al. | 370/50 |
| 4,785,450 | 11/1988 | Bolgiano et al. | 370/95 |
| 4,792,946 | 12/1988 | Mayo | 370/86 |
| 4,817,089 | 3/1989 | Paneth et al. | 370/95 |
| 4,825,448 | 4/1989 | Critchlow et al. | 375/8 |
| 4,893,317 | 1/1990 | Critchlow et al. | 375/97 |
| 4,912,705 | 3/1990 | Paneth et al. | 370/95.1 |
| 4,922,517 | 5/1990 | West, Jr. et al. | 379/58 |
| 4,994,802 | 2/1991 | Critchlow et al. | 341/122 |
| 5,008,900 | 4/1991 | Critchlow et al. | 378/8 |
| 5,022,024 | 6/1991 | Paneth et al. | 370/50 |
| 5,072,308 | 12/1991 | Lin et al. | 358/426 |
| 5,101,418 | 3/1992 | Critchlow et al. | 375/38 |
| 5,119,375 | 6/1992 | Paneth et al. | 370/95.1 |
| 5,121,391 | 6/1992 | Paneth et al. | 370/95.1 |
| 5,146,473 | 9/1992 | Critchlow et al. | 375/8 |
| 5,159,705 | 10/1992 | Critchlow et al. | 455/76 |
| 5,168,507 | 12/1992 | Critchlow et al. | 375/13 |
| 5,177,741 | 1/1993 | Critchlow et al. | 370/110.4 |
| 5,212,830 | 5/1993 | Miller | 455/33.1 |
| 5,224,120 | 6/1993 | Schilling | 375/1 |
| 5,228,053 | 7/1993 | Miller et al. | 375/1 |
| 5,228,056 | 7/1993 | Schilling | 375/1 |
| 5,260,941 | 11/1993 | Wilder et al. | 370/85.1 |
| 5,260,967 | 11/1993 | Schilling | 375/1 |
| 5,263,045 | 11/1993 | Schilling | 375/1 |
| 5,274,665 | 12/1993 | Schilling | 375/1 |
| 5,276,703 | 1/1994 | Budin et al. | 370/93 |
| 5,289,497 | 2/1994 | Jacobson et al. | 375/1 |
| 5,299,226 | 3/1994 | Schilling | 375/1 |
| 5,307,399 | 4/1994 | Dai et al. | 379/57 |
| 5,361,294 | 11/1994 | Lee et al. | 370/29 |
| 5,381,446 | 1/1995 | McIntosh | 375/1 |
| 5,384,826 | 1/1995 | Amitay | 379/59 |
| 5,416,778 | 5/1995 | Chan et al. | 370/95.1 |
| 5,497,373 | 3/1996 | Hulen et al. | 370/79 |
| 5,533,027 | 7/1996 | Akerberg et al. | 370/195 |
| 5,555,258 | 9/1996 | Snelling et al. | 370/29 |
| 5,610,912 | 3/1997 | Johnston | 370/359 |
| 5,737,706 | 4/1998 | Seazholtz et al. | 455/127 |
| 5,805,582 | 9/1998 | Snelling et al. | 370/337 |
| 5,881,131 | 3/1999 | Farris et al. | 370/259 |

FOREIGN PATENT DOCUMENTS

| | | | |
|---|---|---|---|
| 2-34047 | 2/1990 | Japan | H04B 7/26 |
| 2-63352 | 3/1990 | Japan | H04M 1/00 |
| 3-179957 | 8/1991 | Japan | H04M 1/00 |
| 5-153043 | 6/1993 | Japan | H04B 7/26 |
| WO 98/10577 | 3/1998 | WIPO | H04M 11/00 |

OTHER PUBLICATIONS

Douligeris, C., "Intelligent Home Systems", *IEEE Communications Magazine*, Oct. 1993, pp. 52–61.

Duet, D.A., "An Investigation into the Economic Impact of Low–Powered, Digital Radio in the Telephone Distribution Plant", *Globecom '89*, Nov. 27–30, 1989, pp. 38.7.1.–5.

Duet, D.A., "Portable Phone Service for an Upscale Subdivision—An Economic Assessment", *ICC '90*, IEEE Ga, Apr. 16–19, 1990, pp. 206.1.1–4.

Elliott, P.W., and T.M. Kanaropoulos, "Supporting Diverse Services in a Microcellular TDMA System", Tenth UK Teletraffic Symposium: Performance Engineering in Telecommunications Networks, Martlescham, Heath, U.K., Apr. 14–16, 1993, pp. 28/1–9.

Habuka, T., and H. Sekiguchi, "Standardization of Personal Handy Phone (PHP)", *NTT Review*, vol. 5, No. 5, Sep. 1993, pp. 101–105.

Kobb, B.Z., "Personal Wireless", *IEEE Spectrum*, Jun. 1993, pp. 20–25.

Madrid, J.S. Sheldon, and G. Cheadle, "A New Galaxy on the Horizon: Wireless Telephony", TE&M Jul. 15, 1990, pp. 49–52.

Mulder, R.J., "Radio Access in Corporate Technology Networks", 2nd International conference on Private Switching Systems and Networks. London, Jun. 23–25, 1992, pp. 110–116.

Polimene, F., "Use your Telephones as a Home Intercom System", Radio–Electronics, May 1991, pp. 44–48.

Shannon and Weaver, The Mathematical Theory of Communication, The University of Illinois Press: Urbana (1949), pp. 1–117*.

Spicer, J.J., G.A. Halls, and G. Crisp, "Wireless Office Data Communctions using CT2 and DECT" IEE Colloquim on 'Personal Communications, Circuits, Systems and Technology' Digest No. 12, London, Jan. 22, 1993, pp. 9/1–4.

van der Hoek, H., "From Cordless PABX to PCN", *Telecommunications* (International Edition), Mar. 1991, pp. 49–52.

Werbus, V., A. Veloso, and A. Villanueva, "DECT–Cordless Functionality in New Generation Alcatel PABXs", *Electrical Communication*, 2nd Quarter 1993, pp. 172–180.

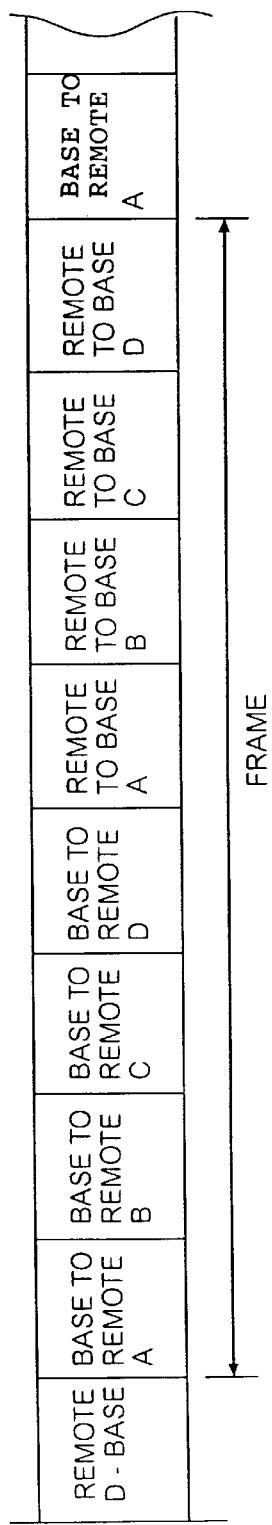
FIG.2
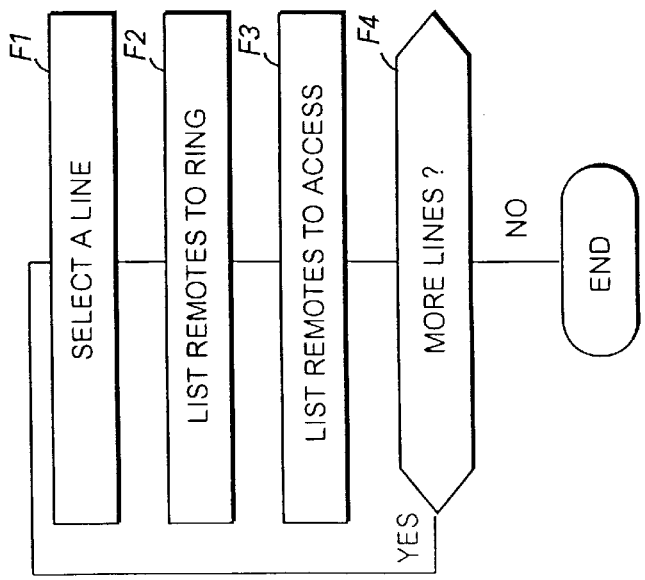
FIG.11B
FIG.11A

COMMUNICATIONS WEBS FOR PSTN SUBSCRIBERS

FIELD OF INVENTION

This document is a continuation-in-part of U.S. Ser. No. 08/709,597 filed Sep. 9, 1996 entitled "Home Personal Communications System," Snelling, McIntosh and Tucker, inventors, now U.S. Pat. No. 5,805,582, which is in turn a continuation of U.S. Ser. No. 08/262,214, filed Jun. 17, 1994, now U.S. Pat. No. 5,555,258 issued Sep. 10, 1996 having the same inventors, all of which documents are incorporated herein by this reference as if fully set forth herein.

BACKGROUND OF INVENTION

Demand for access to voice and data communications on the public switched telephone network ("PSTN") is growing exponentially. Not only is the subscriber base expanding logarithmically, but even more significantly, individual subscribers are beginning to require more than one connection and frequently multiple connections. In addition to cellular telephones, pagers, and other mobile devices, residence-based connectivity is a significant factor in this exponential growth of the PSTN. Subscribers have begun in recent times and in significant volume to require second and third connections as a matter of course, such as for Global Information Infrastructure (so-called "Internet") connectivity, facsimile and data communications and for childrens' lines.

Although it is conventional for a residence to contain standard telephone devices in various rooms supported by one line and perhaps a computer supported by another, the days of standard analog "plain old telephone service" or "POTS" are being overshadowed by the demand for connections with sufficient capacity to support graphics, video, interactive applications and devices, and the so-called "push technology." In 1995, for instance, the Regional Bell Operating Companies ("RBOC's") began transporting more data than voice communications. Accordingly, not only are subscribers employing more lines; the nature of the connection is also changing. The rate of change will only increase over time.

The increased demand for residential subscriber connections, and the ever changing nature of those connections as new standards emerge for new and different services, confront a serious physical obstacle: the permanent physically limited nature of the residential wiring plant. Twisted pair is a small pipe. Standards such as ADSL aim to break through these physically-imposed limitations by delivering multiple channels on a single line and splitting analog and digital channels at the customer demarcation point in a manner that allows digital signals to be delivered to a nearby computer. Standards have also evolved, such as 100-base-T, to squeeze performance from the installed twisted pair plant, but limits dictated by the non-shielded nature of that medium will always exist. In any event, any physical wiring plant or medium, present or future, will suffer electrical and thus transport limitations due to wireline, coaxial, fiber or other medium physical properties and characteristics. Connectivity in the residence which avoids such physically-imposed pipe constrictions would therefore be beneficial.

Inevitably, subscribers will require an ever increasing array of computers and other connected electronic devices throughout the residence. Such devices will include not only those which resemble computers or televisions in nature which require a large data pipe to support graphics, video and audio content. They may also be any electronic device one wishes to access remotely, many of which will tax the infrastructure in their own way with, for instance, new consumer electronics standards and interactive requirements. For example, the anticipated 128 bit Internet protocol address format can, it is estimated, support every lightbulb in the world, each with its own IP address. Residential connectivity must accordingly take into account not only the magnitude and nature of additional capacity demand imposed by each new device, but also the increasing volume of the new devices with which subscribers will inevitably populate their residences and small businesses.

Presently, most residences feature only twisted pair wiring in the walls. Even at the time of this writing, that plant is often insufficient for the requirements imposed by certain conventional residence based computer equipment. Rewiring for additional lines throughout the house, whether via today's twisted pair or perhaps coax standard, is trouble and expense enough, as well as a great disincentive which constricts demand for increased residential bandwidth. As time passes and the rate of technology change increases, however, subscribers could find themselves needing to rewire every several years in order to accommodate changing standards and the need for an ever greater distribution pipe. Although fiber plants could theoretically provide a solution; cost considerations rule them out as a practical solution for most residences and small businesses.

These factors create a need for connectivity in the residence between the PSTN customer demarcation point and an ever increasing array and volume of telephones, fax machines, bandwidth-intensive devices such as computers and televisions, and any other device which may be connected to the PSTN or feature an IP address. Such connectivity must suffice not only for today; it must alleviate the need to rewire the residence in order to accommodate new changes. It must accommodate new devices, formats, protocols and standards, whether analog or digital. It must be flexible and modular in design in order to accommodate a wide-ranging, ever changing, ever evolving set of needs and preferences among the subscriber base. It cannot afford to be constricted by the physically imposed limitations inherent in wireline, coaxial, fiber, or other physical residential plants. Yet it must be a reasonably priced solution in order to avoid imposing a constriction on growth and evolution of the telecommunications distribution infrastructure.

SUMMARY OF THE INVENTION

Systems according to the present invention feature a Network Control Unit or Web Control Unit ("NCU") which interfaces to any desired number of PSTN connections. Where the connections are analog, a Network Interface in the NCU digitizes the signals and otherwise renders them compatible for delivery to a cross-connect switch, which may be internal. The switch may be programmed in the residence or remotely to connect signals from each PSTN connection via radiofrequency link efficiently and in a frequency spectrum-conservative manner to any number and combination of wireless jacks or wireless access units. These wireless access units accompany and connect to the subscriber's telephones, computers, fax machines, and other electronic devices in the residence or small business. Subscribers can, therefore, configure their communications webs to accommodate their own communications needs by programming the switch based on the number and nature of their PSTN connections, their present and future telephones, computers, fax machines and other devices, and their personal preferences about, for instance, what lines should ring and be connected where in the residence.

Handsets and/or Wireless Access Units or wireless jacks employed in communications webs of the present invention may comprise relatively simple and inexpensive electronics to receive and process the radiofrequency link based signals and connect them to the subscriber equipment. The handsets include a transceiver, multiplex/demultiplex circuits, analog/digital conversion circuits such as so-called "codec's" and control circuitry with a combination of, for instance, microphone and earphone for voice communications, and perhaps a jack for data communications.

Wireless Access Units contain circuitry similar to the handset in analog environments, plus additional circuitry for delivery of the signal to a standard interface such as an RJ-11 jack. Such Wireless Access Units can be made available, according to the present invention, to accommodate any physical and electrical interface standard, such as Wireless Access Units for ISDN interfaces and any other desired digital services. When a subscriber decides to connect a new computer to the PSTN via an ISDN line, for example, the subscriber can simply buy a new, relatively inexpensive digital Wireless Access Unit with RS 232 port, connect that unit to the computer, reprogram the Network Control Unit to connect the new ISDN connection and new Wireless Access Unit, and thereby be connected via an efficient RF link rather than needing to call a contractor to tear the walls out.

The PSTN connections may therefore terminate in the residence at a Network Control Unit which may be physically small and innocuous in appearance, perhaps placed on a table or counter or mounted on a wall and, if desired, coupled to a nearby electrical outlet and to a controller such as a personal computer or other interface if the user desires control other than by interfaces on the Network Control Unit itself. The unit may feature a stub antenna, enclosed planar antenna or other desired antenna. Throughout the residence, any device desired to connect to the PSTN can connect to or contain its own Wireless Access Unit which may be battery powered and connect to the NCU via the RF link. No additional physical medium need be planted.

The present invention accordingly makes possible wireless, efficient, flexible and modular connectivity between any desired device and the PSTN (or other telecommunications infrastructure) within the residence or small business. The Network Control Unit itself may be modular in design to accommodate various circuit boards for various changing and evolving standards and protocols. Multiple NCU's may be employed, or multiple NCU functionality may be incorporated into a unit, in order to accommodate objectives such as, for instance, diversity, hand-off capability and additional capacity. New Wireless Access Units may be purchased for whatever particular devices a particular subscriber desires, and he or she may update the system with new circuit boards and new Wireless Access Units and perhaps new handsets as time passes, new devices and services evolve, and standards change.

The Network Control Unit may be programmed by the subscriber using an interface on the unit. It may be connected via network or PSTN link to a remote programming source, either for the subscriber's control or control by a service bureau. Such programming of the Network Control Unit, and other control and signaling, may occur via connectivity to the PSTN signaling and control infrastructure, including the so-called "Advanced Intelligence Networks."

It is accordingly an object of the present invention to provide a flexible, modular system which provides connectivity between the PSTN or other telecommunications infrastructure and any desired electronic devices a subscriber wishes to connect, via RF link.

It is an additional object of the present invention to provide business and residential wireless connectivity between the PSTN and computers, handsets, and other devices which eliminates the need to rewire businesses and residences in order to accommodate new standards and services.

It is an additional object of the present invention to provide RF-based connectivity between any number of PSTN lines and any number of now existing or future electronic devices, in a modular and flexible manner.

Other objects, features and advantages of the present invention will become apparent with respect to the remainder of this document.

BRIEF DESCRIPTION OF THE DRAWINGS

FIG. 2 is a schematic, greatly simplified, representation of a Time Division Multiplex Access ("TDMA") frame having eight slots supporting four bi-directional channels in accordance with one embodiment of the present invention.

FIG. 11A is a simplified flow diagram illustrating one configuration sequence of the Network Control Unit of FIG. 3.

FIG. 11B is a table showing configuration of the Network Control Unit of FIG. 3

DETAILED DESCRIPTION OF THE DRAWINGS

Figure 1:
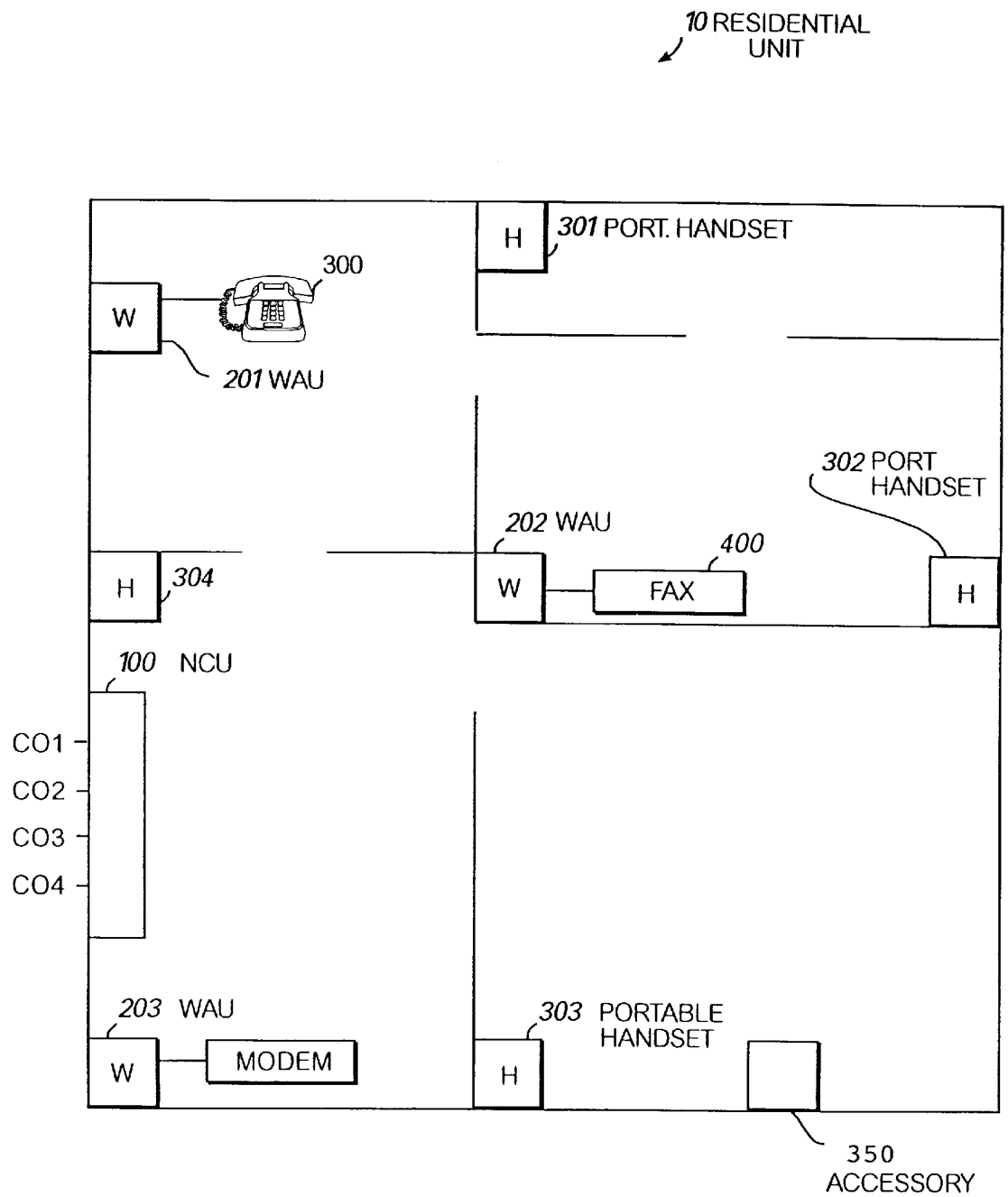
FIG. 1 is a schematic view of a residence which features one embodiment of a system according to the present invention.

FIG. 1 is a schematic hypothetical floor plan for a residence or business containing one simple embodiment of a communications web according to the present invention. The floor plan shows a Network Control Unit or "NCU" 100 which terminates four central office POTS lines or connections designated "CO1" through "CO4." In embodiments other than the particular one shown in FIG. 1, the connections may occur other than in the so-called "local loop." They may also occur in any medium, including wireline, coaxial, fiber, terrestrial radiofrequency link, satellite link. Each connection may supply any number and sort of communications channels, including analog or digital according to any present or future standard, format or protocol. The connections may also originate in or contain signals transported by telecommunications infrastructure or networks other than the PSTN, whether switched or non-switched, circuit based switched, packet based switched or otherwise. For convenience in disclosing structure and operation of communications webs according to the present invention, however, reference will be made to the PSTN, but in a non-limiting fashion.

A number of Wireless Access Units or wireless jacks ("WAU's") 201–203 may be found throughout the floor plan, linked via RF link to the NCU. Additionally, a number of handsets and conventional telephones 300–304 whether portable or connected to a WAU may also be found throughout the floor plan. Other electronic devices such as a fax 400 may be included; fax 400 in FIG. 1 is shown connected to a WAU 202.

Any number of connections may terminate in one or more NCUs for a particular location according to the present invention. Similarly, WAUs according to the present invention, which may be RF linked to one or more NCUs for a particular location, can be adapted to accommodate any telecommunication, consumer electronic or other required standard, format or protocol, whether analog or digital and can be manufactured and sold individually for that purpose to render communications webs according to the present invention modular in nature with a mix of components to suit every reasonable taste and preference. A WAU may connect to, for instance, a "telephone", such as telephone instrument 300 in FIG. 1, a conventional modem, directly to a personal computer via ISDN WAU, to a fax machine via fax WAU, or any other desired electronic device. A number of WAUs and handsets may be employed according to the present invention to accommodate any particular combination of electronic devices the subscriber desires to have connected to the PSTN. FIG. 1 is simply a hypothetical floor plan in order to provide a modicum of topological perspective relative to NCUs, WAUs, handsets and other electronic devices as employed in communications webs of the present invention.

NETWORK CONTROL UNIT

Figure 3A:
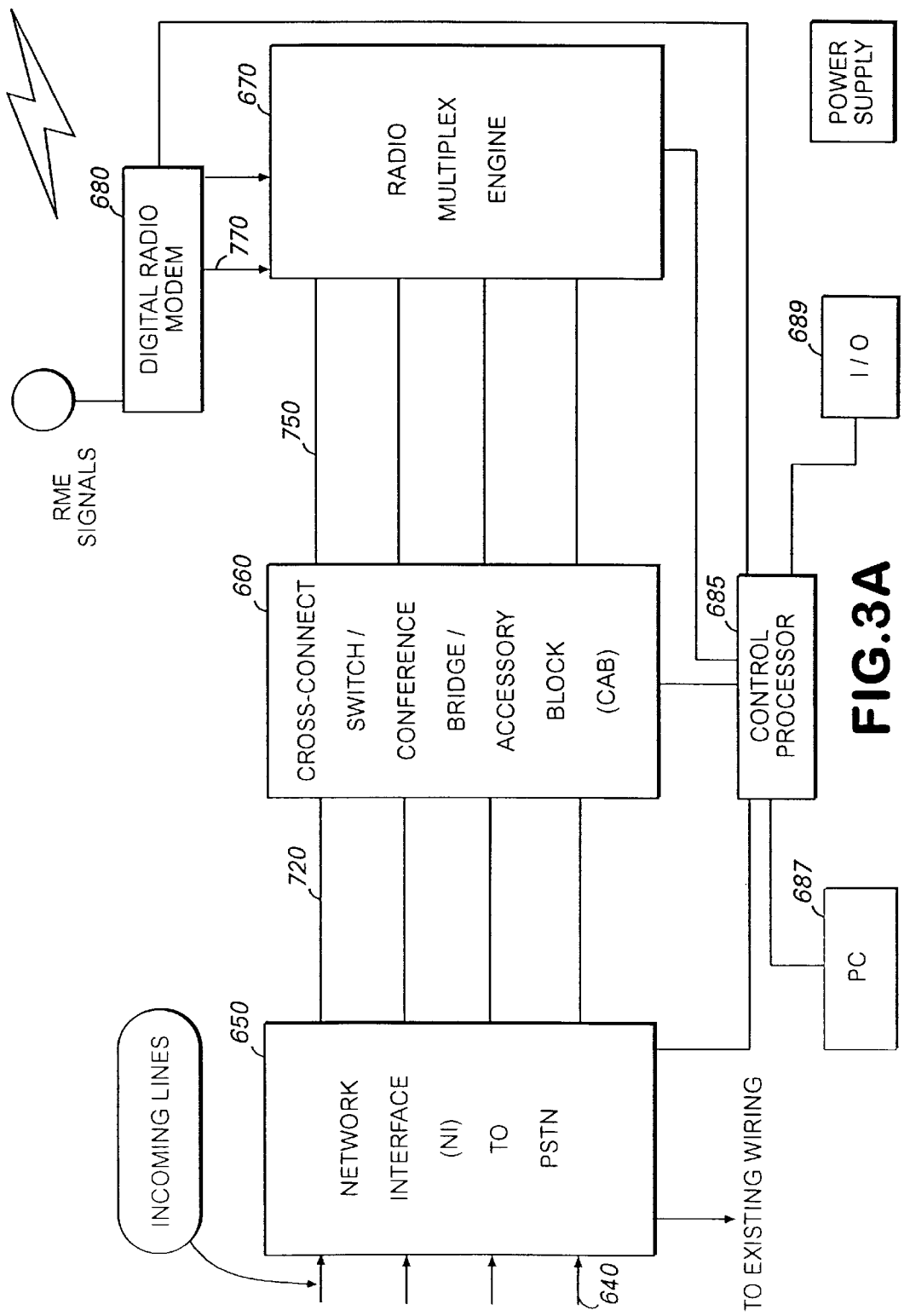
FIG. 3A is a high level functional block diagram of a Network Control Unit according to one embodiment of the present invention.
Figure 3B:
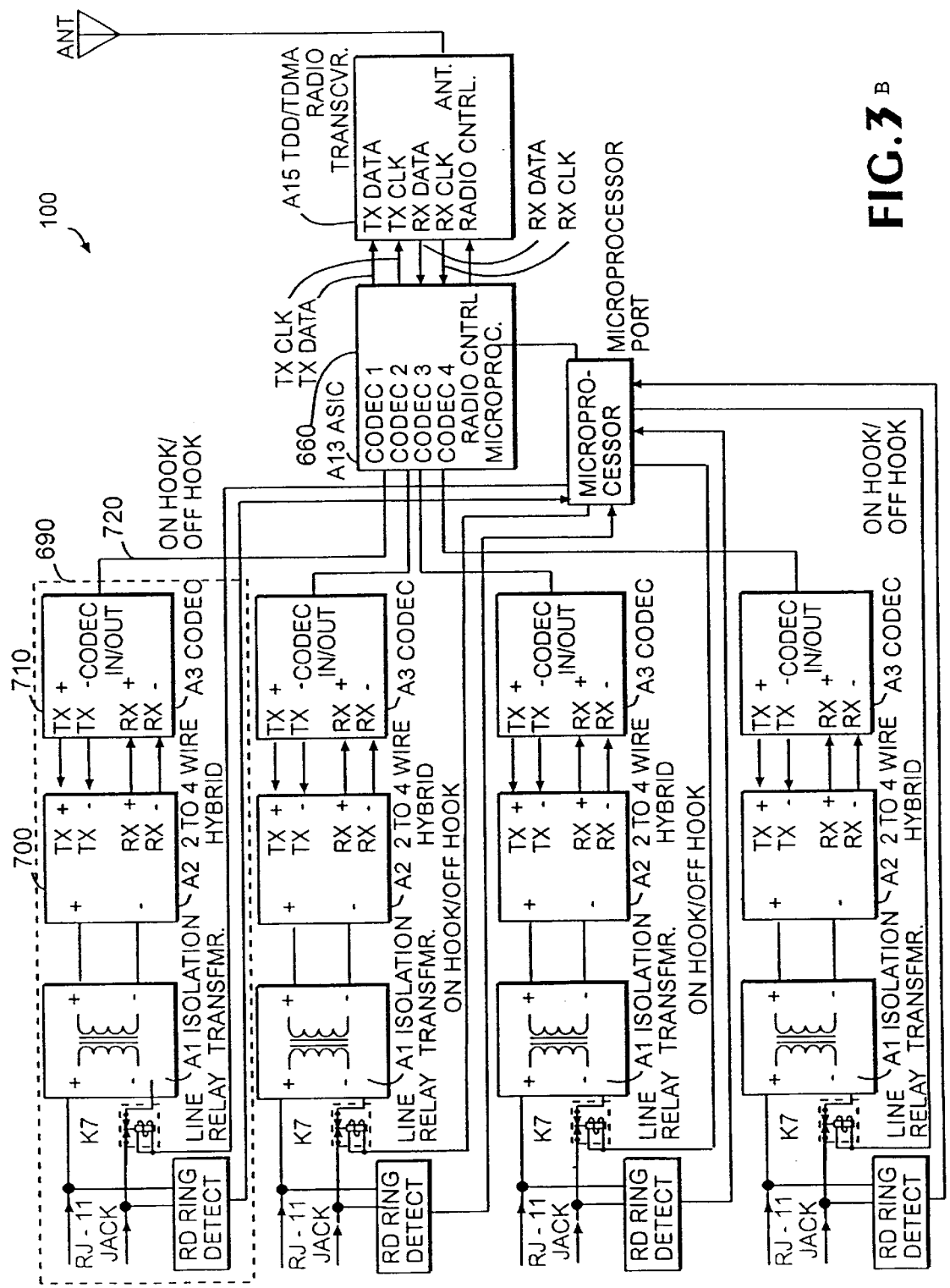
FIG. 3B is a schematic diagram, at a lower level than FIG. 3A, of a Network Control Unit according to one embodiment of the present invention in which four coder/decoder or "codec's" are employed in connection with four analog POTS lines.
Figure 3C:
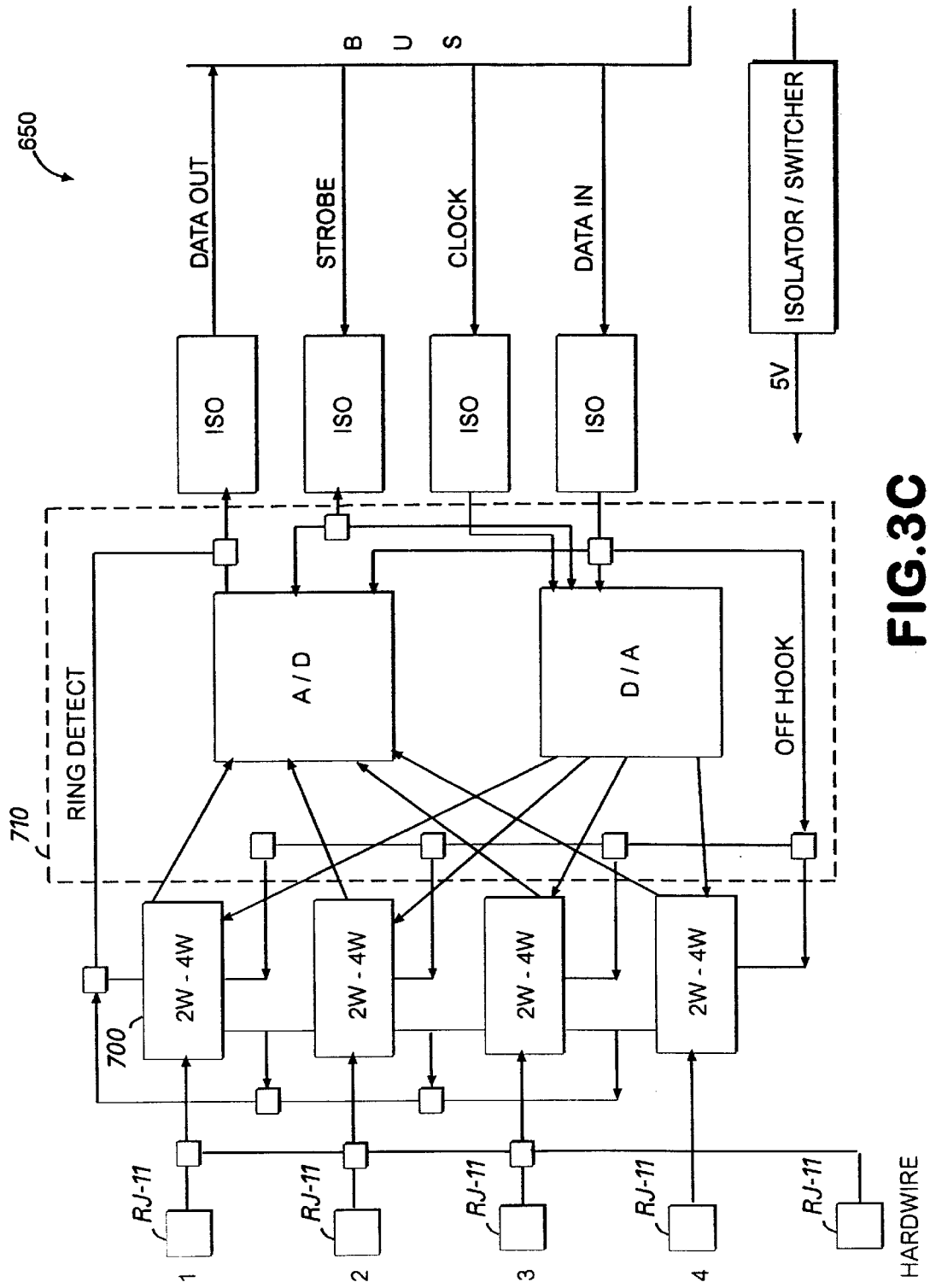
FIG. 3C is a functional block diagram of a single code which may accommodate the four lines, for instance, shown in FIG. 3B as an alternative design for purely analog POTS lines.
Figure 4:
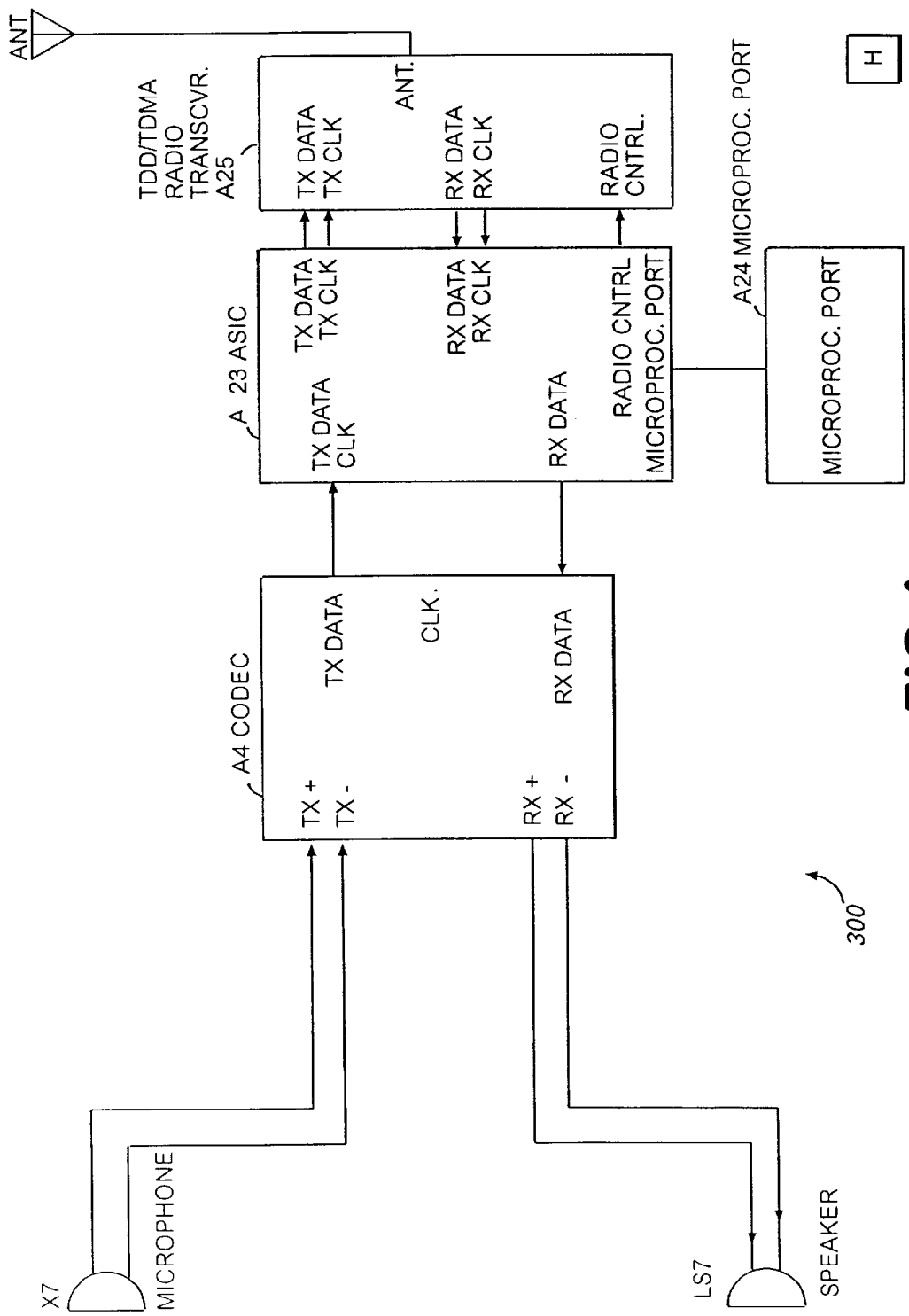
FIG. 4 is a functional block diagram of one embodiment of a handset according to the present invention.

FIGS. 3A through 3C show, in functional block diagram format, embodiments and portions of embodiments of Network Control Units ("NCU's") according to the present invention. According to a preferred embodiment of the present invention, NCU 100 includes interface circuitry for interfacing with PSTN or other lines or connections from a switch or other component of the PSTN or other telecommunications transport infrastructure or network, whether analog or digital. This circuitry, denominated "Network Interface" 650 as shown in FIG. 3A, couples to switching (and, if desired, bridging and accessory) circuitry as shown with numeral 660 in FIG. 3A. This discussion considers signals in a "downstream" or a PSTN to NCU to WAU direction, from which corresponding signal flow in the opposite direction is apparent.

The Cross Connect Switch/Conference Bridge/Accessory Block ("CAB") components couple signals from the Network Interface corresponding to incoming lines, in a predetermined and programmable manner, with additional functionality, if desired, to downstream circuitry for eventual RF transmission to WAU's and handsets. The switching and bridging components of the CAB are the portion of the Network Control Unit that allow the subscriber either remotely or locally to designate by programming into the NCU which of his or her telephone instruments, computers, fax machines, and other devices connect to various PSTN lines at particular times of day or under particular conditions. Either or both of the Bridging and Accessory circuits may be omitted, if desired, so that the CAB only performs the switching functionality.

The signals being properly switched in the CAB as designated for the subscriber's devices are then delivered to the NCU's "Radio Multiplex Engine" as shown in FIG. 3A with numeral 670. The RME multiplexes the signals as, for instance, by time division multiplex access, or according to any desired format, onto a number of predetermined channels for bandwidth and RF frequency conservation. The multiplexed signals are delivered to Radio Transceiver 680 where the signals may be conditioned, again multiplexed according to any desired format, and modulated onto an appropriate RF carrier or carriers in a programmable manner or as otherwise desired for transmission to WAUs 200, handsets 300 and other devices if desired. Multiplexing, modulation, and other processing in order to render signals at the CAB output compatible for RF transmission, may occur in the same module or any desired combination of modules or circuits.

An NCU Controller 690 connects to all circuits in the NCU and may be programmed via user interface on the NCU, via computer coupled to the Controller or other portions of the NCU, or remotely over one of the incoming lines 640. The Controller 690 may itself be networked to the PSTN or other telecommunications infrastructure signaling and control network, such as for remote or partially remote control by Advanced Intelligence Networks or other signaling and control networks.

In greater detail, the Network Interface 650 of the NCU may be modular in design and contains the circuits that connect to the public switched telephone network for accommodating various media, including twisted pair, coax, fiber and wireless, and various modes, including analog, digital or a hybrid. A Network Interface may be modular and portions for all lines may be implemented in applications specific integrated circuitry ("ASIC") medium to accommodate analog circuits, or services requiring, among other interfaces, ISDN, T-1, CATV/COAX, ATM, micro-ATM, AMPS, N-AMPS, TDMA digital cellular, CDMA digital cellular, analog or digital SMR (Nextel), PCS, LEO satellite, geosychronous satellite, Internet protocol or any other present or future form of wireless or wireline local loop or other telecommunications infrastructure service. As shown in FIG. 3B, the Network Interface for a system according to the present invention which accommodates four POTS lines, could take the form of a quad arrangement of independent Direct Access Arrangement ("DAA") circuits 690, each having appropriate transformer, isolator and line protection circuitry as required, a two to four wire hybrid 700, and a coder/decoder ("code") 10. The Network Interface circuitry is accordingly adapted for appropriate isolation, impedance matching, line protection, medium conversion (two wire to four wire) and analog-to-digital/digital-to-analog conversion in order for its output signal 720 to be coupled to CAB 660. (The functionality in POTS versions of direct access arrangement circuits 690 comprises conventional components and is conventionally implemented.)

FIG. 3C shows an alternative arrangement for a Network Interface adapted to accommodate four POTS lines. There, the line conditioning circuitry which can include hybrids 700 and other components cross-couples to a single code 710, instead of the requirement that a code be employed for each line 640. Output of the Network Interface may be on a bus 730 instead of individual outputs coupled to CAB 660, in order to couple Network Interface 650 to CAB 660 via a multiplexed connection for physical simplicity and logical implementation. For ISDN, the Network Interface may be the so-called "U-Interface" and associated 4-level dibit modem circuitry. Other digital services require a Network Interface especially adapted to interface to a particular medium, format and protocol.

For any of the wireless local loop or so called fixed wireless services including satellite, the Network Interface may be a wireless modem which includes a radio receiver or transceivers and appropriate modulation/demodulation, coding and decoding circuitry. When the Network Interface is a wireless modem/Radio Transceiver, the NCU 100 operates as a radio transponder or rebroadcast unit, communicating with the PSTN via one wireless protocol, and with the WAUs 200, handsets 300 and other components of systems according to the present invention via the same or perhaps different protocols. This aspect of the invention may be counter-intuitive: If the connection to the PSTN is wireless, one approach is simply to connect directly to any location in the residence instead of relaying signals through the NCU 100. However, systems according to the present invention address a problem this approach would present, because Radio Transceivers that interface to the PSTN typically must comply with elaborate air interface standards having precise frequency control, well-defined RF bandwidth, higher transmit power (to accommodate the greater distance to a cell tower or PCS antenna), better receiver sensitivity, higher battery drain and shorter battery life, and increase complexity and expense. A handset 300 or a WAU 200 according to the present invention, however, is a far simpler and less expensive device which need only accommodate the present invention's less stringent internal air interface standards, but nevertheless retain the functionality to provide corded quality and reliability for indoor/nearby outdoor service that is inexpensive, compact, lightweight, flexible and manufactured and sold, if desired, tailored to specific devices such as faxes or various digital standards which not every subscriber may wish to employ.

Incoming connections to the Network Interface 650 could be physically separate twisted pairs as in the case of analog POTS lines where each line terminates from the PSTN via an independent twisted pair; alternatively, each incoming circuit can be multiplexed over a single pair, such as two digital circuits provided by a conventional, basic rate (2B+D) ISDN line. A 6 megabit per second micro-ATM fiber connection could provide digital voice service, MPEG-2 digital video and other services over a single optical fiber which could be de-multiplexed (multiplexed for outgoing or upstream information) in the Network Interface, and incoming lines could be virtual. That is, additional lines could be assigned on an as needed basis and charged accordingly. For example, a subscriber might have connection to one line from 10:00 p.m. to 7:00 a.m, two lines from 7:00 a.m. to 9:00 a.m. and four lines from 9:00 a.m. to 7:00 p.m. and be billed accordingly for the partial use. As discussed below, the CAB 660 can be programmed to accommodate changes in the PSTN connections in real time in order to distribute bandwidth and service as desired among various WAUs 200, handsets 300 and the other end user interface devices.

The NCU 100 may be capable of routing calls or sessions via the global information infrastructure, whether or not compressed (such as, for instance, using elemedia branded compression or other compression). Such an NCU 100 adapted for this purpose at present may employ NetPhone branded functionality, as one example of presently available suitable functionality. Successors will be equally suitable.

CROSS CONNECT SWITCH/CONFERENCE BRIDGE/ACCESSORY BLOCK

Cross connect switch/conference bridge/accessory blocks ("CAB's") according to the present invention may be, electronically or virtually, an n×m switch which is programmed to interconnect any incoming signal 720 from the Network Interface 650, (whether physical, virtual, multiplexed or wireless) to a number of output signals or interfaces which correspond to communications channels, according to one topology, or to combinations of the handsets, telephones, fax machines, computers or other devices serviced by WAU's 200 and/or handsets 300 of the present invention, according to another topology. The CAB 660 can, but need not, include functionality simply to bridge or conference these same circuits and/or remote devices, thus eliminating the need for further processing of the signals beyond CAB 660. A CAB may additionally contain a variety of decoders, generators, synthesizers and other circuits as desired.

CAB 660 is preferably coupled to a local Control Processor and/or an external computer and/or network or server, if desired. The external connection may be directly by bus or synchronous connection, or via any of the PSTN lines 640. In systems according to the present invention having multiple NCUs, CABs 660, Control Processors 690 and other components may be coupled and/or networked among various NCUs and/or external/or server control capacity.

The CAB shown in FIG. 3A is under control of a local Control Processor 685 and personal computer 687. For voice services, the CAB 660 may function similar to a central switchboard and conference bridge routing each line to one or more Wireless Access Units 200 and/or handsets 300 as programmed in Control Processors 685 and/or PC 687. Multiple lines 640, handsets 300, telephones connected to WAUs 200, and other devices may be conferenced to form any number of permutations and combinations of conferences. One wireless handset can call another without using any of external lines 640 simply using the allotted time slots, codes or RF channels involving the two handsets 300, or telephones connected to a WAU 200. A conference call of any two or more internal handset or telephone devices can similarly occur. Calls or conferences among multiple devices on multiple networked or shared NCU's can similarly occur.

The CAB 660, like other components in the NCU, the WAU's and the handsets, can be implemented in analog circuits including relays, transistors, CMOS media or any other application specific or nonspecific analog components and/or integrated circuits, but preferably signals 720 arriving at CAB 660 are digital so that CAB 660 may be implemented entirely digitally. CABs 660, according to the present invention, are adapted to route and direct data signals, such as, for example, when using external data services via Internet or internal networks within the subscriber's location. In the voice case, virtual circuits may be established for each call which can remain in place for the duration of a call. In the data case, a Carrier Since Multiple Access ("CSMA"), Asynchronous Transfer Mode ("ATM") or packet switching protocol can be employed, among other formats or protocols, in order to support a larger number of bursty devices. A combination of virtual data circuits and CSMA can be employed if desired. In similar fashion, CABs 660, according to the present invention, are also adapted to accommodate voice and data traffic simultaneously, routing traffic and managing resources as desired.

Conference Bridge functionality in the CAB 660 is preferably implemented as a high quality digital bridge which maintains all connections at suitable and equal audio levels. Although the Conference Bridge functionality can be implemented in analog circuits, again it is preferably implemented digitally using logic or digital signal processing. Digital leveling and noise control may be used to maintain voice circuit quality regardless of the numbers of parties bridged together. The Conference Bridge may also be adapted to bridge in one or more outside lines onto an existing circuit, adding handsets 300 and/or WAUs 200 to the circuit.

The Accessory Block functionality, which may, but need not, form a portion of CABs 660 according to the present invention, may contain features which add flexibility and additional levels of services to communications webs according to the present invention. The Accessory Block functionality may include, for instance, DTMF generator, DTMF decoder, speech synthesizer, speech recognizer, speech compression expander (ADCPM), digital speech interpolation (DSI), caller ID decoder, low or high speed telephone modem, fax modem capable of Group III or similar functions, real time clock/calendar digital telephone answering device (TAD) and other functionality as desired. These functions are provided in conjunction with the Control Processor 685 and other portions of CAB 660 to implement capability such as autodialing, remote programmability, voice command features, digital voice prompting, voice store and forward, and other advanced functionality. Portions or all of the Accessory Block Functionality may be sited on board or remote to NCU 100 as desired for particular implementations. External connections can adapt the NCU to an existing external fax/modem unit, for instance.

Functionality which may also be included in the NCU 100 includes intelligent call control. For instance, a CPT generator included in NCU 100 can generate simulated dial tone when off hook. The NCU 100 interprets touch-tone dialing inputs from a handset 300 or WAU 200, adds appropriate prefix or other signaling, or for instance, automatically adds new and changed area code signaling for dialing a number which the NCU 100 recognizes but whose area code or other call control information has changed. Likewise, the NCU 100 can correct dialing errors in single digits of familiar numbers in order to prevent misdials and wrong numbers. Such functionality can be employed to add signaling so that the user need only dial a portion of the number, similar to automatic "fastfill" data entry in conventional software applications. Such signaling can also reflect intelligence within the device or based at least in part on information to which the NCU 100 connects, which provides least cost routing to different long distance carriers according to time, and station called, among other factors. Various other signaling capabilities can be implemented and automated as desired, including those such as automating the Internet Service Provider/Long Distance server.

The NCU Switching, Bridging and Accessory Block functionality or any other software employed by NCU 100 may reside on board the NCU and may but need not be remotely programmable or upgradeable. It may also incorporate remotely accessed or pushed program and or data objects and/or applications as desired, including in the JAVA, Active/X, or other languages. It may also include any other desired application, including, for instance, voice/data encryption among the NCU 100, WAU 200 and handset 300 for privacy, network security, fraud protection and authentication.

NCU's 100 according to the present invention preferably include a standard connector such as an RJ-11 connector which may be hardwired to a single line telephone or connected, for example, to existing in-home wiring. This connector permits the NCU 100 to manage the existing telephone or wiring as part of its network, perhaps permitting them to answer any ringing line. Alternatively, a POTS NCU 100 could have a drop out relay or FET circuit which may automatically switch the existing wiring over to this connector in the event of a power failure or a system failure. If the NCU 100 is equipped with backup batteries or other auxiliary power, it may continue to function either until mains power is restored or its batteries become exhausted in which case it drops off-line and switches to the emergency bypass routing to the external connector.

Control Processor 685 according to the present invention commands switching, routing, RF, accessory and other functionality implemented in CAB 660, Radio Transceiver 680 and other circuits in NCU 100s according to the present invention. Control Processor 685 could be a small microcontroller chip, although more processing power may be required to accommodate ISDN and other digital interface NCUs 100. Then, external PCS 687 and, if desired, servers, may participate in the control functions. A very simple algorithm by which the Control Processor 685 governs CAB 660 for the topology shown in FIG. 1 is shown in FIGS. 11A and 11B, in which, step-by-step, lines 640 are matched in the CAB 660 to various WAUs 200, handsets 300, and other devices. The control algorithms and programming itself may occur locally as by an interface 689 which may be implemented in buttons or a keyboard, by PC 687 or external connection, including network or telecommunications infrastructure.

Alternatively, systems of the present invention are adapted to permit control of the NCU 100, including Control Processor 685 and CAB 660 from a remote service center so that a subscriber can call the service center in the event the subscriber feels technically short of the task of programming his or her NCU to accommodate various WAUs 200 and handsets 300. Configuration data could also be downloaded from a website.

PC and other external connectivity leverages on higher intelligence of the PC, additional mass memory functionality for updates and databases and similar applications, the more convenient user interface, and more elaborate applications software such as, for instance, directory management, spreadsheets and database managers, PC based speech synthesis and recognition software.

RADIO MULTIPLEX ENGINE

CAB output signals 750 are coupled to a radio multiplex engine 670 according to the present invention which can comprise a digital logic block that implements any of the following functionality: multiplexing/demultiplexing, preferably but not necessarily TDMA/TDD (Time Division Multiplex Access/Time Division Duplex), forward error control and general error management, speech compression if required, code division multiplex and demultiplexing, if any, hopset generation if any, and other critical timing, synchronization and coding functions critical to the operation of the systems according to the present invention.

RME's 670 according to the present invention generally but not necessarily operate at speeds sufficiently high to render Control Processor 685 management ineffective, although that need not be the case.

RME signals 770 are coupled, in systems of the present invention, to wireless Radio Transceiver ("RT") circuitry 680 as shown in FIG. 3A. The RT 680 may be a low cost multiplexed Radio Transceiver or set of transceivers which provides proper modulation onto RF carriers as desired with or without multiplexing and duplexing according to any of the following formats or others: TDMA/TDD, TDMA/FDD, CDMA/FDD, CDMA/TDD, FDMA/TDD, or FDMA/FDD, or any of these with frequency hopping or direct frequency spread spectrum. The primary function is to achieve transmission of multiple simultaneous independent data streams to WAUs 200 and handsets 300.

Multiplexing is but one aspect of the larger issue of bandwidth conservation and resource sharing, which also includes duplexing and channelizing, among other things. For purposes of this disclosure, multiplexing means methods of multiple remote units communicating simultaneously with a common NCU 100 for access to the PSTN. Duplexing means methods of simultaneous upstream and downstream communications, such as simultaneous communications from an NCU 100 to a given handset 300 and from the handset back to the NCU. Channelizing means methods of bandwidth sharing so that multiple systems, each consisting of an NCU, handsets and WAU's, which may happen to fall within radio range of one another, such as in an apartment building, for instance, can share the same band but not interfere with one another.

Time division multiplexing and code division multiplexing are both acceptable forms of multiplexing, among others, for purposes of the present invention. With time division multiplexing, carrier bandwidth is narrower than code division multiplexing access bandwidth, facilitating frequency-domain channelizing. While CDMA could also be employed for channelizing, such as, for instance, the different NCU's using orthogonal spreading codes on the same RF carrier frequency, it is generally necessary to control transmit power levels very tightly so that the well-known near-far problem of direct sequency spread spectrum does not create difficulty. This means that it would be necessary to coordinate the transmit power levels from one NCU to the next and among the handsets as well. This could be a technically challenging problem.

Most CDMA cellular and PCS systems that are in place as of this disclosure use frequency division duplexing (FDD) rather than time division duplexing (TDD) for bi-directional communications. It would not be practical to use CDMA for duplexing at present. Using TDD, it is possible to use the same RF channel for bi-directional communications. TDD also eliminates the need for the costly duplex filter that routes transmit energy to the antenna away from the receiver and vice versa, replacing it with a relatively compact, inexpensive diplex switch. TDMA/TDD with frequency-domain channelizing is therefore the preferred embodiment of duplexing as of this disclosure. Time division multiplexing is preferred over FDMA, at present, because FDMA would require the generation of a separate carrier for each of four or more independent communications links, which is expensive.

Discrete multitone or DMT/TDD may offer some advantages in multipath fading environments over TDD, and may be considered. This option is economically imposing until DMT (also known as orthogonal discrete frequency modulation or ODFM), which requires rapid fast Fourier transform and inverse FFT calculations, becomes more tractable using conventional DSP engines.

Conveniently, the RT circuitry 680 need not conform to any error interface standard, since it communicates only with like equipment and usually does not interface to the PSTN or any other public network except via a separate, higher quality transceiver if any is implemented in the Network Interface 650 or connected to it.

Systems according to the invention can be implemented with any number of modulation formats. Those include partial response, quadrature partial response (QPR), binary phase shift keying (BPSK), differential binary phase shift keying (DBPSK), quadrature phase shift keying (QPSK), differential quadrature phase shift keying (DQPSK), pi-over-four quadrature phase shift keying (pi/4QPSK), pi-over-four differential quadrature phase shift keying (pi/4DQPSK), frequency shift keying (FSK), four- or eight-level FM, discrete multitone (DMT) (or orthogonal discrete frequency modulation). The particular modulation format chosen depends in large degree on the radio regulations to be complied with, which may vary from jurisdiction to jurisdiction. Proper operation of systems of the present invention may be accomplished using practically any modulation format, and none is considered essential to the invention. QPSK or a variation of it may represent a good tradeoff between economy, bandwidth efficiency and sensitivity to multipath fading at present, however, and is accordingly as of the date of this filing the preferred modulation format.

Any modulation format can be overlaid with spread spectrum. Frequency hopping can be used as a multiple access technique. Spread spectrum systems are afforded the advantage of higher transmit power under the radio rules governing unlicensed radio transmitters in some countries, including the U.S. and Canada. In addition, some direct sequence implementations have anti-multipath properties which can be exploited to provide more robust communications. Both techniques may offer some advantages with respect to mitigating interference from like or unlike systems operating within the same bandwidth. For these reasons, spread spectrum techniques may be employed in the preferred embodiment of the invention.

Via an independent communications protocol, the RT unit 680 can communicate with other NCUs 100 that fall within radio range. The NCUs 100 can share hopset data interference records, timing and usage information, all toward the end of avoiding one another's transmissions. In like manner, the components of each system, NCUs 100, WAUs 200, handsets 300 all transmit at the lowest power necessary to provide reliable communications, using power management sensing and response to interference or other criteria. In this manner, each system minimizes its "radius of interference," the approximate circular area surrounding a given system within which it is capable of generating interference in other (like or unlike) systems operating in the same band.

WIRELESS ACCESS UNITS

Wireless Access Units 200 according to the present invention may be of two general sorts: (1) analog for a wireless telephone jack function such as one that can accommodate a telephone or a conventional modem; or (2) digital, for a wireless computer or digital device connection (such as DB-25, USB, Ethernet, ISDN-ST, PCMCIA or similar serial or parallel data communications connection).

Figure 5:
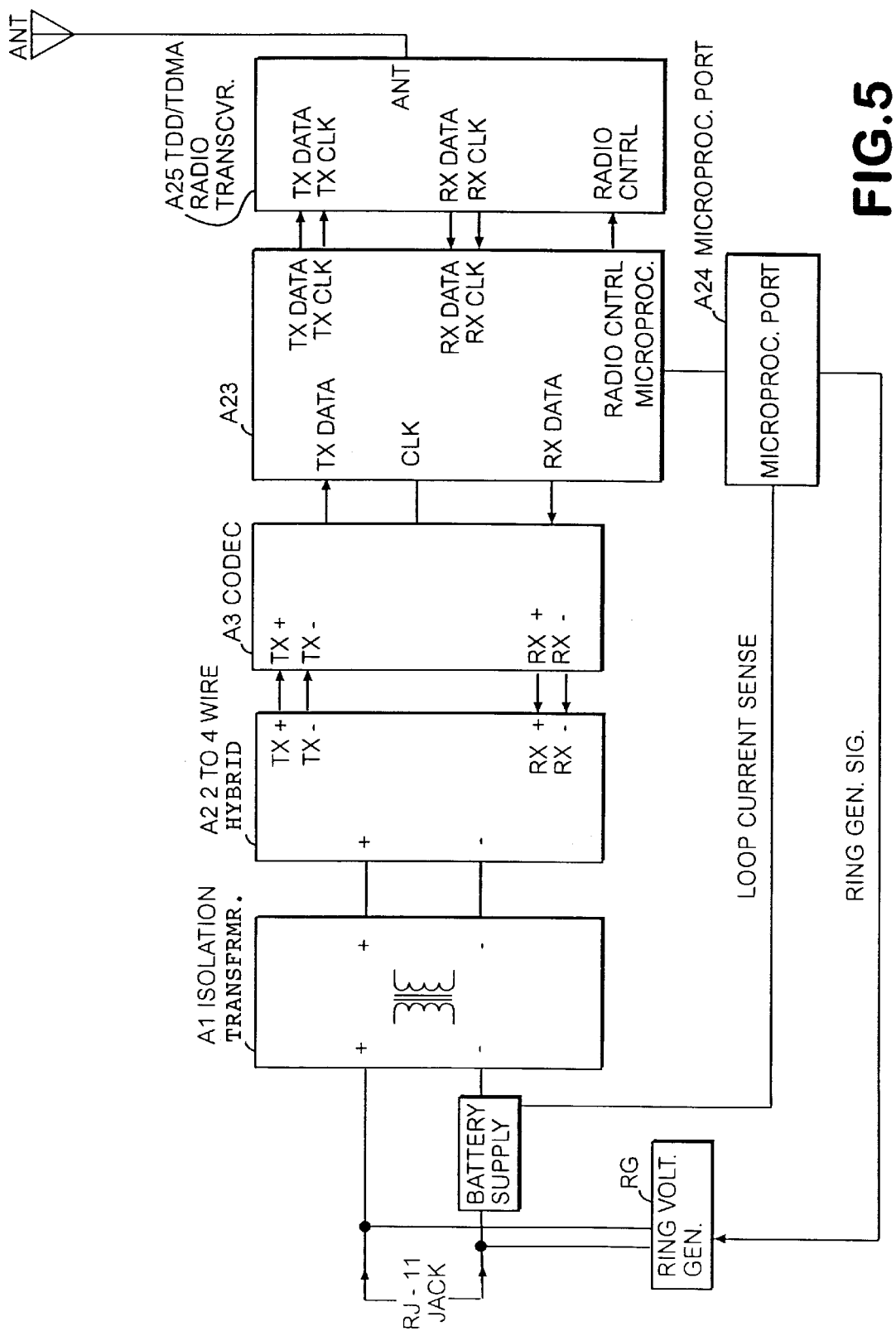
FIG. 5 is a functional block diagram of one embodiment of a Wireless Access Unit according to the present invention.

FIG. 5 shows one form of analog WAU 200 according to the present invention. The analog WAU 200 may include a Radio Transceiver 800 which links WAU 200 via RF connection to NCU 100, a Radio Multiplex Engine 802, a Control Processor 804, and circuitry that provides basic subscriber loop functions of battery, over voltage protection, ringing, supervision (off hook sensing), code, hybrid and test functionality (so called borscht) functionality. The analog WAU 200 of FIG. 5 may be implemented in a small unit which resembles a wall transformer with one or more RJ-11 jacks on the back or side, and it can, if desired, draw power from any AC outlet and provide an analog telephone type connection to a computer modem, a fax machine, a telephone answering device, a standard telephone or any other device that connects with a standard RJ-11 jack. The unit may but need not be transparent to caller ID information, passing it through from the PSTN. Similarly, the unit may pass through coded ringing and other custom signaling. Its power supply provides power for standard telephones which are line powered. Its high voltage ring generator rings telephones with the standard 90 volt rms, 20-Hz ring signal or other standards for foreign countries. Note that while this unit is typically though not necessarily "wired" to the AC power wiring and therefore is not totally "wireless," the link between this unit and the incoming lines 640 connected to NCU 100 is wireless. It therefore eliminates the subscriber's need to place telephones where telephone outlets are located. Battery power, if employed, allows totally wireless operation, providing even more flexibility in location.

Figure 6:
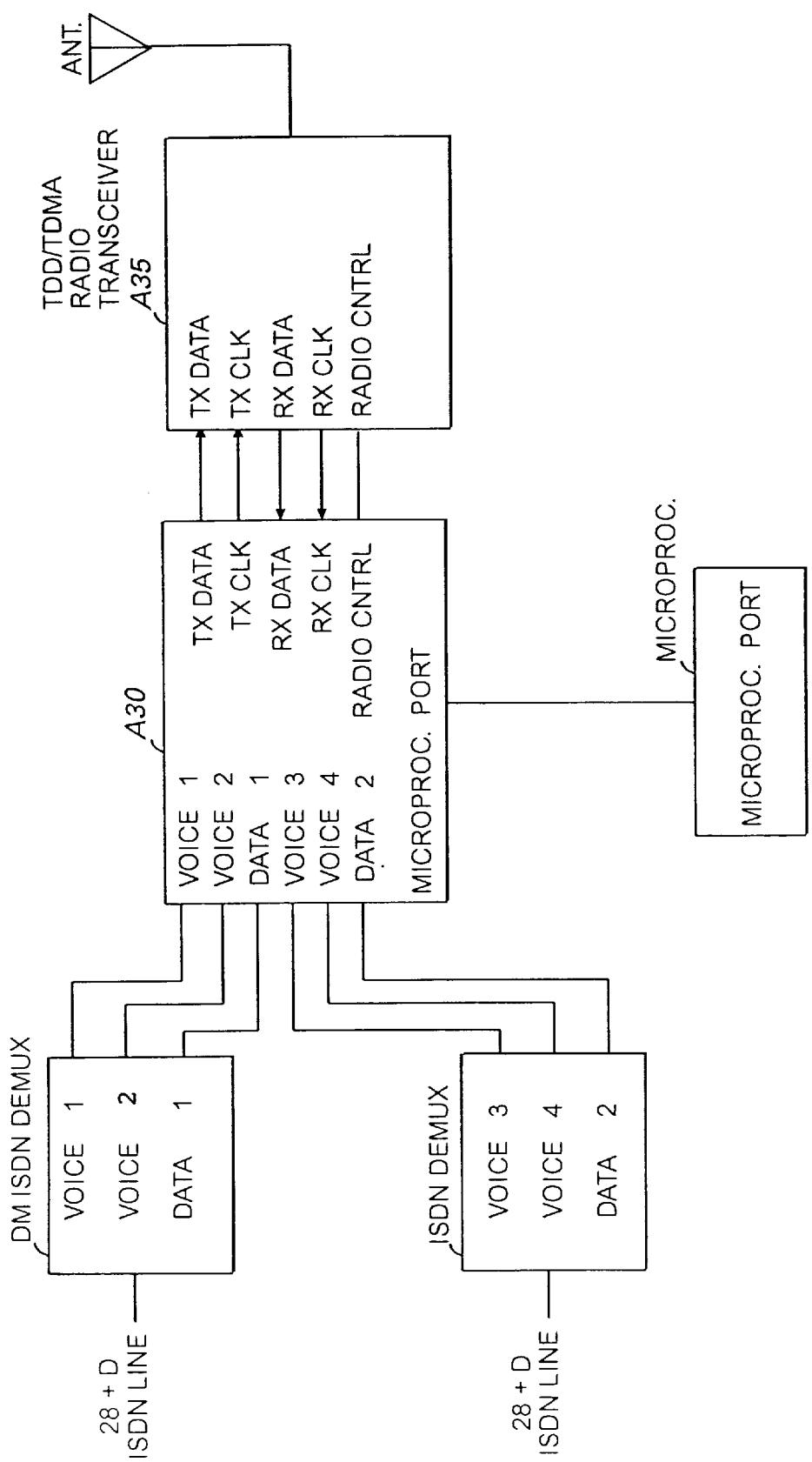
FIG. 6 is a functional block diagram of a Network Control Unit which is adapted to accommodate the ISDN standard, alone or in connection with other analog PSTN connections.
Figure 7:
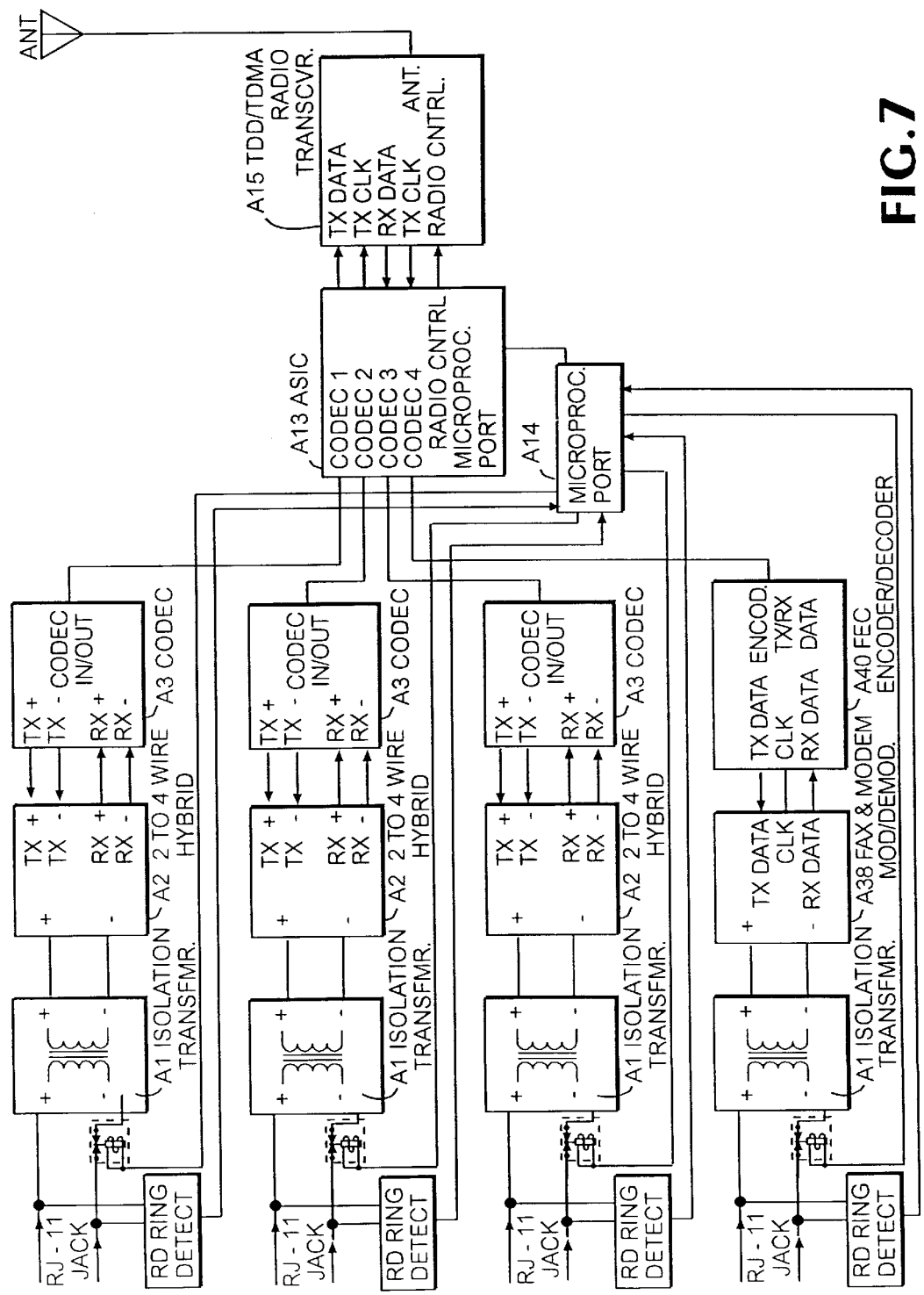
FIG. 7 is a functional block diagram of a Network Control Unit according to the present invention adapted to accommodate three analog and one digital PSTN connections.
Figure 8:
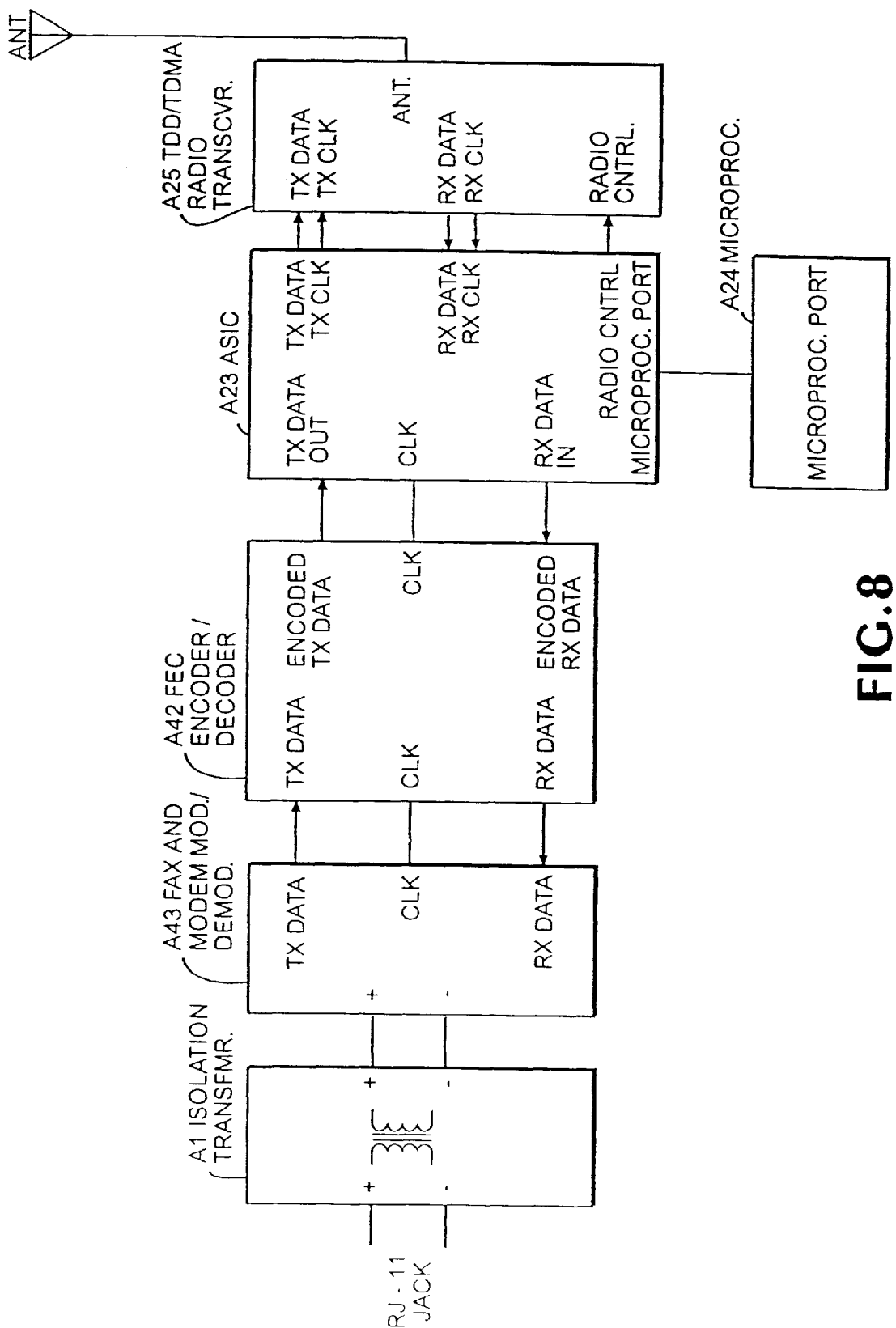
FIG. 8 is a functional block diagram of one embodiment of a digital Wireless Access Unit according to the present invention.
Figure 9A:
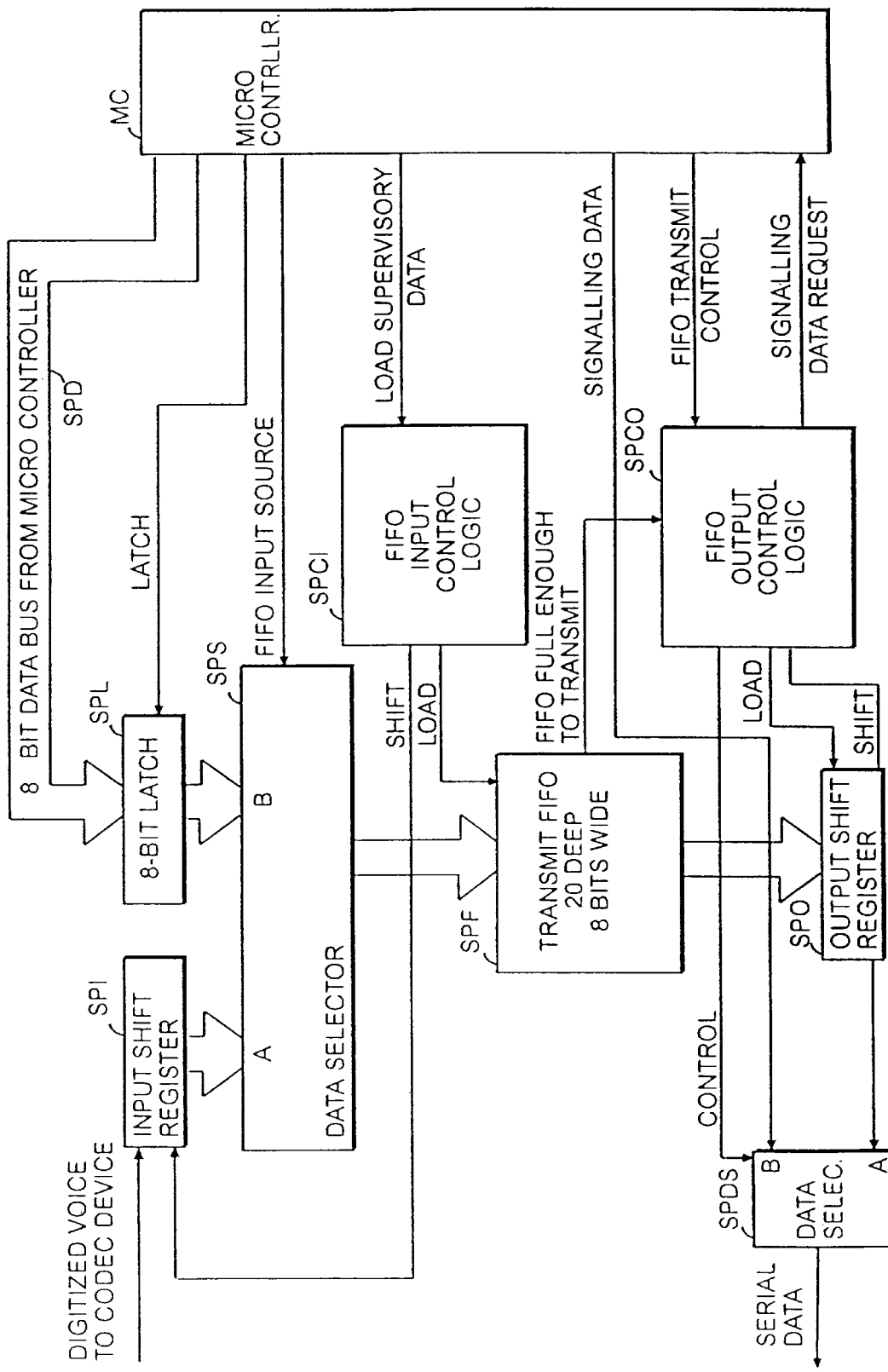
FIGS. 9A and 9B are functional block diagrams as one embodiment of switching/processing circuitry contained in one embodiment of a Wireless Access Unit or handset according to the present invention.
Figure 9B:
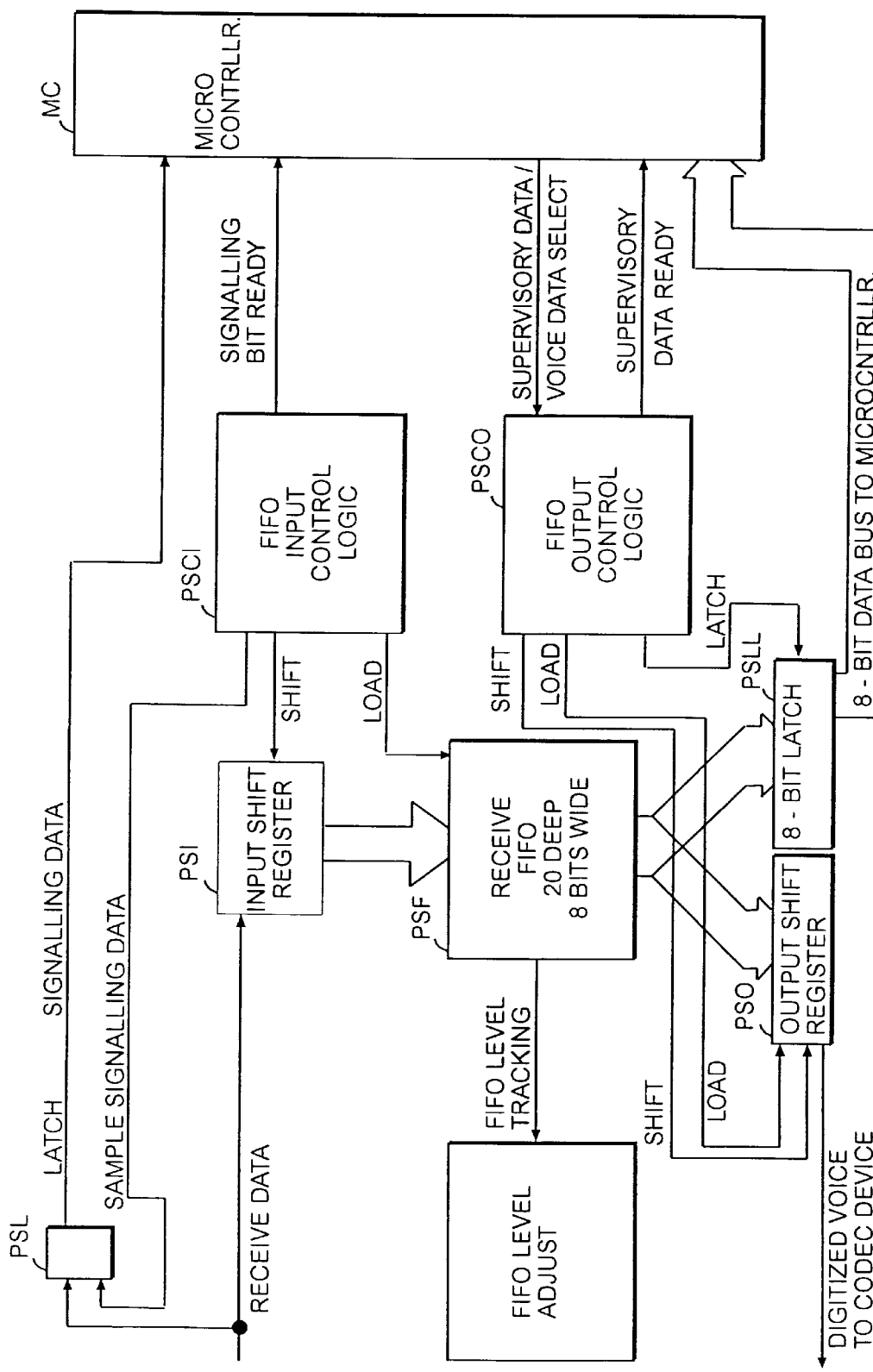
Figure 10:
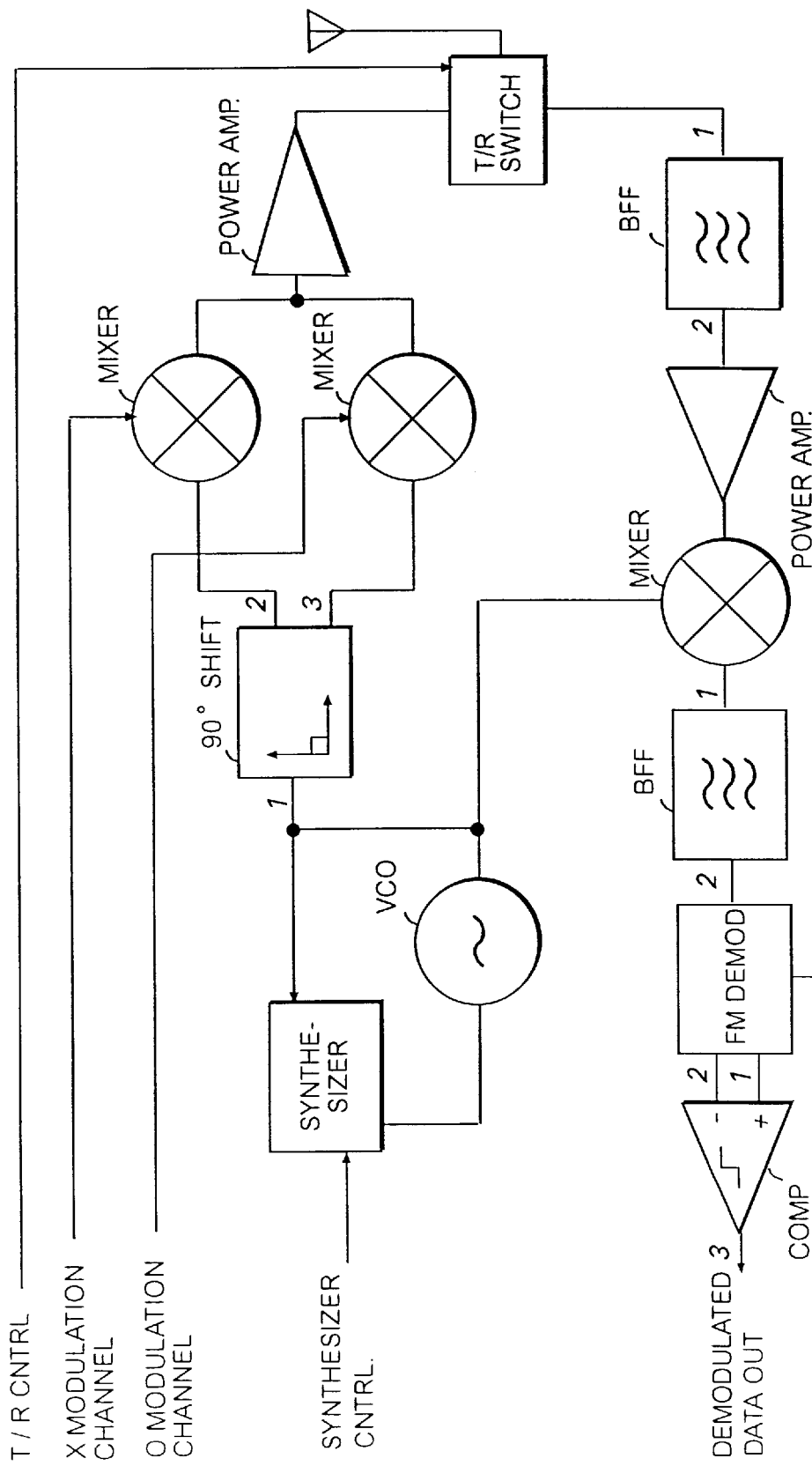
FIG. 10 is a high level functional block diagram of transceiver circuitry which may be employed in the present invention if desired.

A digital Wireless Access Unit 200 of one sort according to the present invention is shown in FIG. 6. Such a Wireless Access Unit 200 can provide wireless connection to computers, computer peripherals, ISDN-ST telephone sets and other digital devices. Since the radio link used in systems according to the present invention is digital, the digital circuitry in the Wireless Access Unit 200 principally performs a buffering, error control, and protocol conversion function. The external digital interface can take many forms, including DB-25, the standard serial port connector; USB, Intel's new universal serial bus standard; parallel-port (printer) connection; Ethernet; 10-base-T; 100-base-T, Fast or Gigabit Ethernet; PCMCIA and others. Again, the WAU 200 may be of the sort which is adapted to operate with an external fax/modem such as shown, for instance, in FIG. 13. Digital Wireless Access Unit 200, like analog Wireless Access Unit 200, may be mains or battery powered, so that they may provide untethered convenience to the user.

WIRELESS CONTROL/MONITORING ACCESSORIES

Systems according to the present invention can also perform many control and monitoring functions at a subscriber's location for convenience and increased efficiency. For instance, a wireless doorbell accessory or WAU 200 can emit a coded ring in response to a ringing doorbell signal. The subscriber could then press an "intercom" soft key, placing the subscriber in full duplex communications with the front door visitor and possibly calling up his or her image on a display. Other wireless accessories can provide control over home lighting, garage door opening, and security monitoring. Likewise, via appropriate soft key, the handset or other interface device can control televisions, stereo equipment, heating, air conditioning and appliances. Baby monitoring via wireless audio monitor and other consumer electronics functionality are accommodated by the present system, whether or not via the CE-bus.

OPERATION

The four main component parts of systems of the present invention, as disclosed above, are the Network Control Unit 100, Wireless Access Units 200, handsets 300 and Wireless Control/Monitoring Accessories 350. While each component may contain an onboard microcontroller which governs its basic functions, the NCU 100 alone or acting in concert with external controller capacity is preferably the principal controller and manager of the entire communications web. All remote components are preferably simple, reliable and preferably of limited intelligence/functionality for reduced costs and increased modularity and so that system performance and functions are principally determined by the NCU 100. The NCU 100 may contain on-line firmware and/or software upgrade capability as discussed above. Through this capacity and the centralized intelligence architecture of the systems according to present invention, functioning of the entire system can be upgraded, new features added, software bugs repaired and hardware bugs patched, all by downloading new firmware into the new NCU 100. The majority of the NCU's computer program code is preferably maintained in flash, reprogrammable memory. Firmware in remote units are preferably implemented in ROM memory, although not necessarily.

The NCU 100 is the central part of the systems' star network topology for the entire system, the NCU 100 selects RF channels, hop sequences if any, and spreading codes if any; it managers ID strings for the various remotes, and it performs the other functions related to network management, remote unit registration and authentication, and communications protocol management. The NCU 100 also controls the switching and interconnection of the CAB 660, and drives all the Accessory Block features of CAB 660. The following examples describe operation of two embodiments of the communications webs according to the present invention.

EXAMPLE 1

Figure 12A:
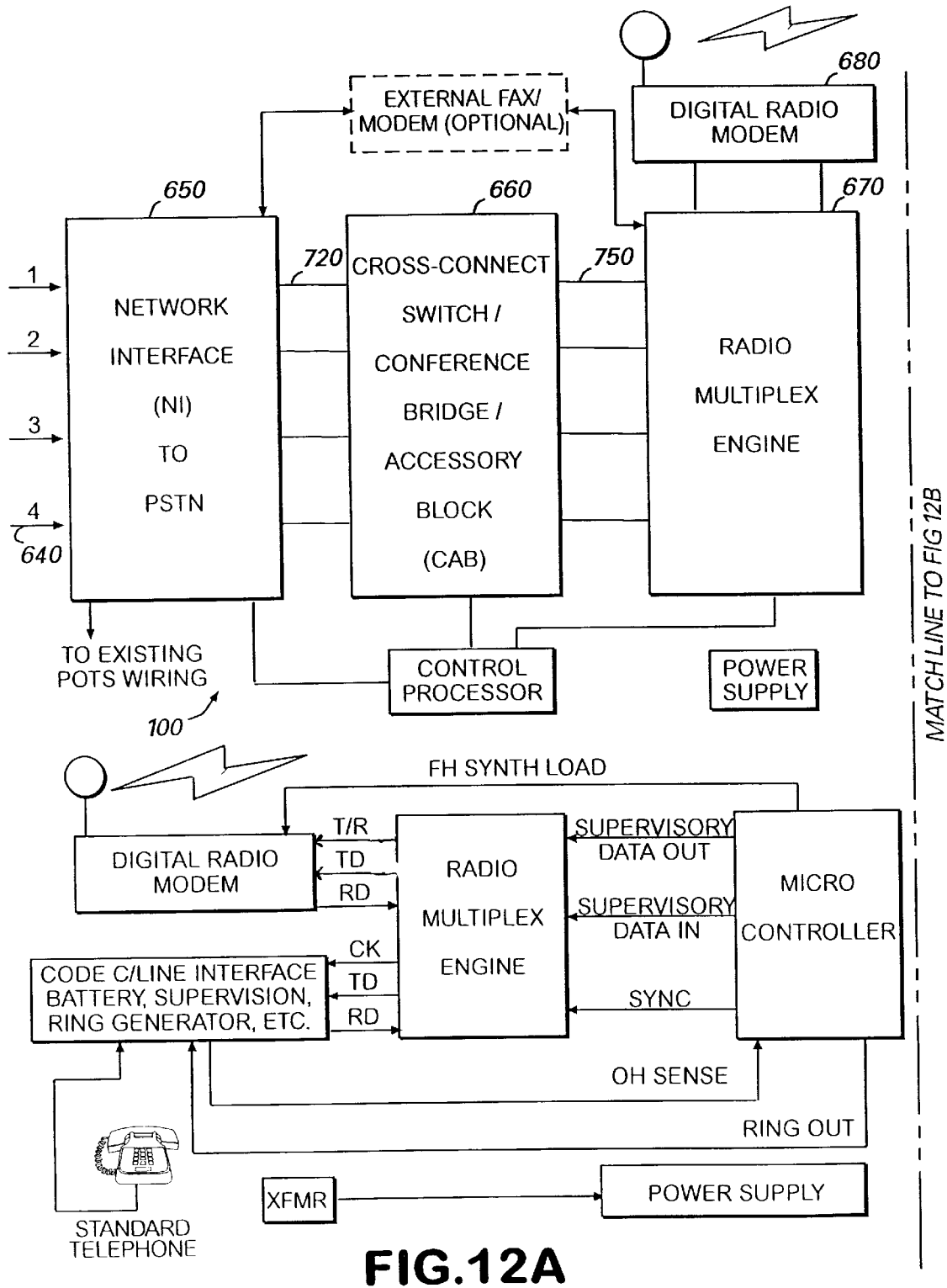
FIG. 12 is a schematic diagram showing operation of a communications web according to the present invention according to Example 1 discussed below.
Figure 12B:
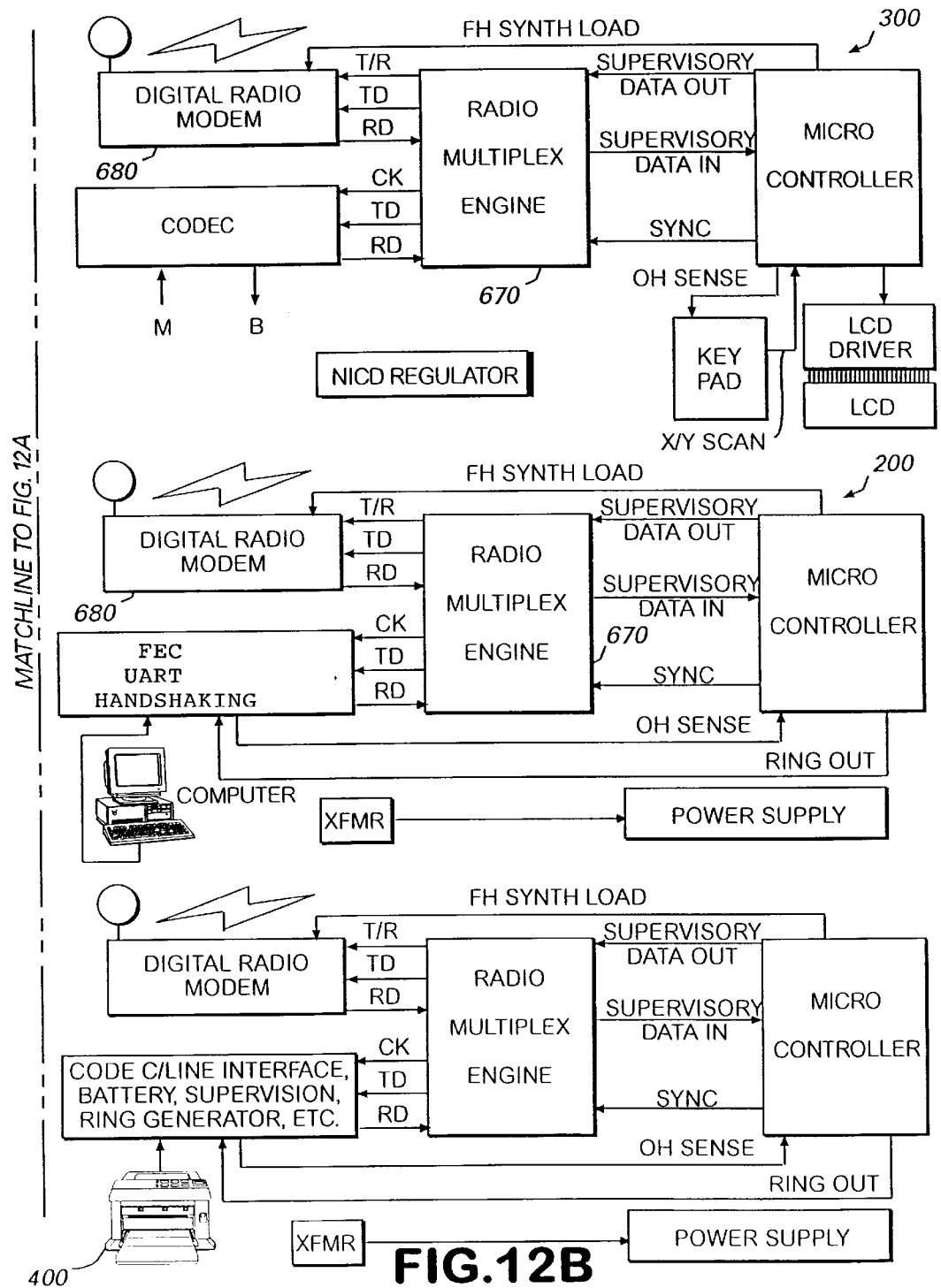

A system according to the present invention is shown in FIG. 12 with four incoming POTS lines, an NCU 100 in the basement or attic, a wireless handset, and three Wireless Access Units 200 which correspond to a telephone, a computer, and a fax machine. The system may be programmed as follows: POTS line 1 is programmed in the CAB 660 to ring through and connect to the LCD handset 300. POTS line 2 rings through and connects to Wireless Access Unit number 1 which is connected to a standard telephone via an RJ-11 jack. POTS line 3 connects to Wireless Access Unit number 2, which, in turn, accommodates a fax machine. POTS line 4 connects to Wireless Access Unit number 3 which connects via RS-232 interface to a personal computer.

Signals from POTS lines 1–4 are coupled to Radio Multiplex Engine 670, multiplexed as in TDMA format and modulated onto an RF carrier in RT or digital radio modem 680 for transmission. Handset 300 receives the signal from the NCU 100, and demodulates, demultiplexes and processes the information intended for handset 300. That information is contained in a signal provided to the interfacing circuitry and coder/decoder 650 for delivery to the human interface. The signals are also provided to an LCD driver and screen. In an upstream direction, signals from the keypad and microphone are processed, multiplexed, modulated and forwarded to NCU 100 which ultimately demodulates, demultiplexes and processes the signals for delivery to POTS line 1. Wireless Access Units 1–3 operate generally in a similar manner as far as the RF and multiplexing circuitry are concerned. However, Wireless Access Unit number 1 contains interface circuitry adapted to accommodate a standard telephone, including, for example, coder/decoder circuitry, line interface, battery, supervision, and ring generator circuitry which interfaces to an RF-11 jack. Wireless Access Unit number 2 interface circuitry intended for a fax machine may be similar or identical to Wireless Access Unit number 1.

Wireless Access Unit number 3 is configured with interface circuitry to accommodate a RS-232 port rather than an RF-11 analog jack. Accordingly, forward error correction, universal asynchronous receiver/transmitter and handshaking circuitry is included in connection with RS-232 serial port standards.

If the subscriber desires to eliminate POTS line 4, for example, or only to subscribe to it for a portion of the day, POTS line 3 could be reprogrammed in the CAB 660 to accommodate Wireless Access Unit number 3 for computer communications while POTS line 2 is configured to ring through to Wireless Access Units 1 and 2 for the telephone and fax machine. Any other combination may be employed as desired, as the user desires new services or different services, or adds devices to the communications web with their attendant Wireless Access Units.

EXAMPLE 2

Figure 13A:
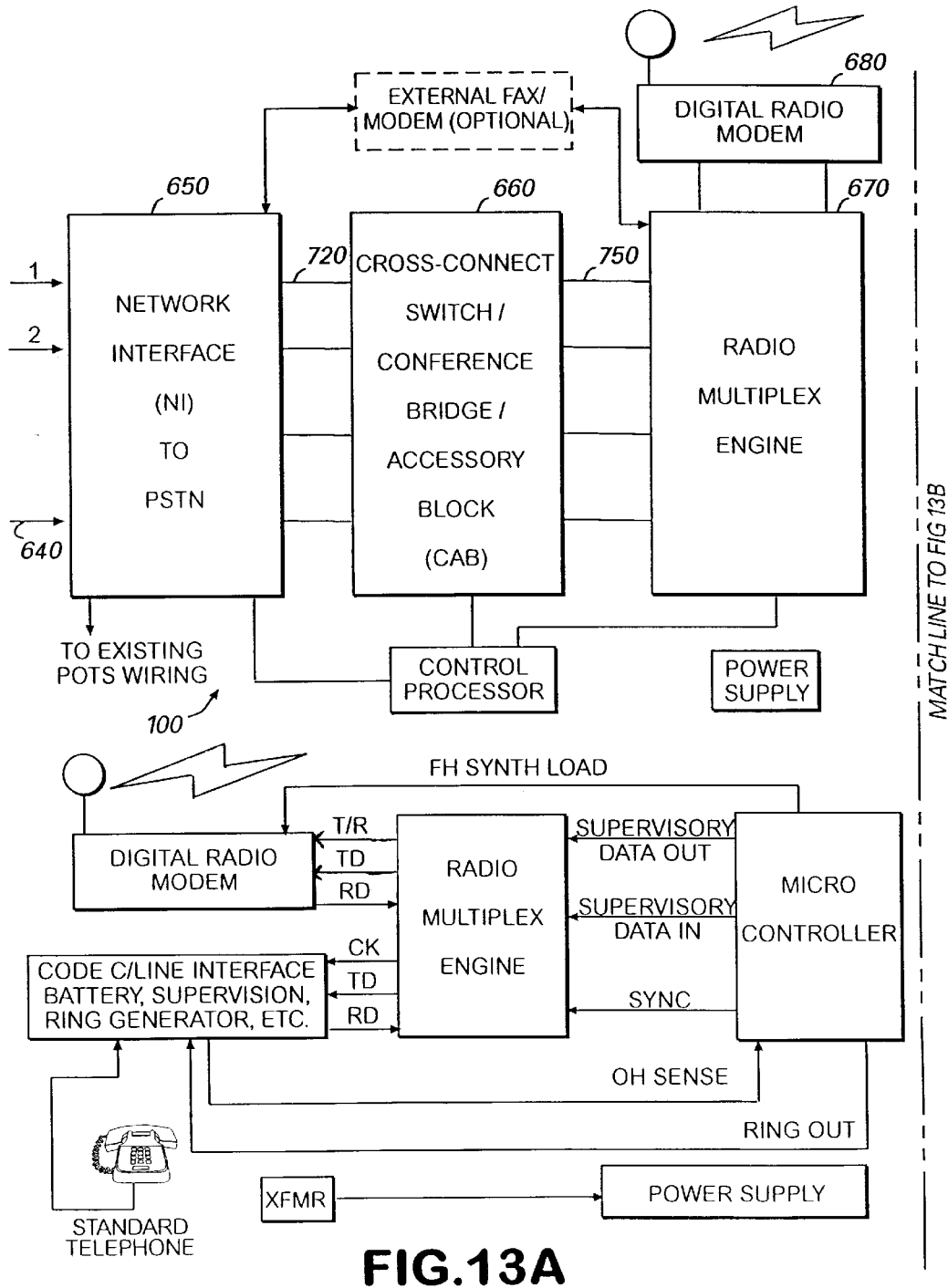
FIG. 13 is a schematic diagram showing operation of another communications web according to the present invention according to Example 2 discussed below.
Figure 13B:
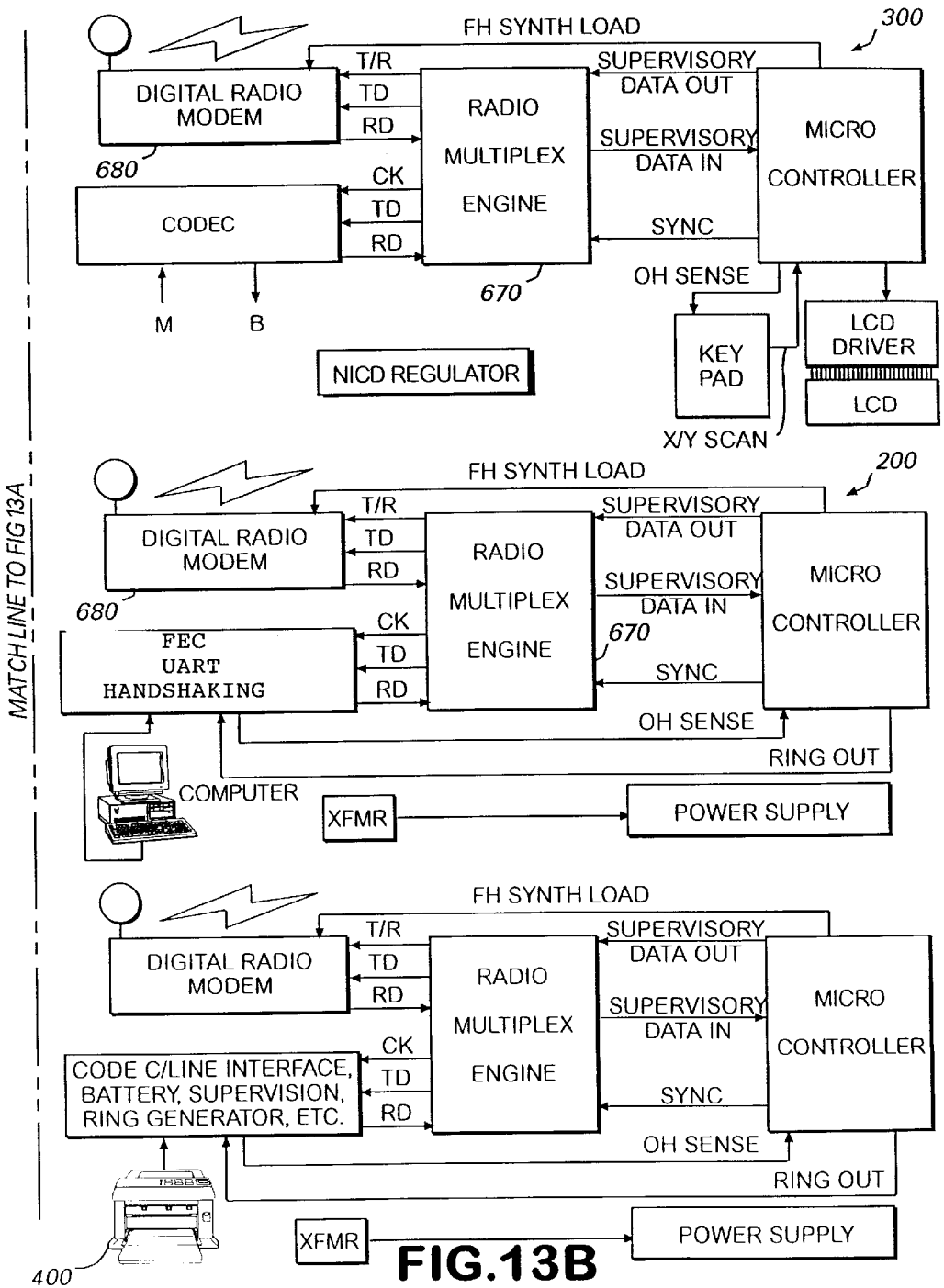

Another system according to the present invention is shown in FIG. 13 with two incoming POTS lines and an ISDN line. POTS line 1 is programmed in CAB 660 of Network Control Unit 100 to ring through and connect to LCD handset 300. POTS line 2 is programmed to ring through and connect to Wireless Access Units number 1 and number 2, which in turn connect to the standard telephone and a fax machine, respectively. The ISDN line is programmed to connect to Wireless Access Unit number 3 and thus to a computer via a serial port. Again, the lines may be programmed to connect to various handsets 300 and Wireless Access Units 200 as needed as the user desires new or additional services or adds other devices. With the existing devices shown in FIG. 13, for instance, the user could program CAB 660 to connect POTS line 1 to handset 300 and Wireless Access Units 1 and 2 in order to eliminate the second POTS line. Similarly, line 1 could be designated the voice line for connection to handset 300 and Wireless Access Unit number 1. Line 1 or Line 2 could also be wired in the Network Interface 650 or otherwise to connect directly through to existing wiring as shown in FIG. 13.

The foregoing has been provided for purposes of disclosing various embodiments of the present invention. Communications webs according to the present invention and their components and processes may contain various modifications and adaptations, including those which employ new standards and modes of implementation, without departing from the scope or spirit of the present invention.

What is claimed is:

1. A communications web for use by a public switched telecommunications (PSTN) subscriber, said web comprising:
   a. at least one Web Control Unit comprising:
      i. at least one web interface, said interface adapted to be connected to the PSTN, said interface adapted to render the signals from the PSTN compatible with circuitry in the Web Control Unit, and to render the upstream signals compatible with the PSTN;
      ii. at least one switch adapted to couple signals from each of said at least one web interfaces to at least one output, in accordance with control signals provided by a programmable controller;
      iii. said programmable controller adapted to control said switch according to the number and types of PSTN connections coupled to said at least one web interface; the number, types and locations of subscriber's equipment serviced by the communications web; and the desires of the subscriber;
      iv. Web Control Unit multiplex/demultiplex circuitry coupled to said switch and adapted to multiplex downstream signals from said switch outputs into form compatible for delivery to Web Control Unit transceiver circuitry, and to demultiplex upstream signals from said Web Control Unit transceiver circuitry for delivery to said switch;
      V. said Web Control Unit transceiver circuitry adapted to modulate said downstream signals from said Web Control Unit multiplex/demultiplex circuitry onto at least one RF carrier in order to transmit said downstream signals via RF link, and to demodulate upstream signals received via RF link for delivery to said Web Control Unit multiplex/demultiplex circuitry;
   b. at least one Wireless Access Unit comprising:
      i. Wireless Access Unit transceiver circuitry adapted to receive downstream signals via RF link from said Web Control Unit and to demodulate said downstream signals for delivery to Wireless Access Unit multiplex/demultiplex circuitry, and to modulate upstream signals from said Wireless Access Unit multiplex/demultiplex circuitry onto at least one RF carrier in order to provide said upstream signals via RF link to said Web Control Unit;
      ii. Wireless Access Unit multiplex/demultiplex circuitry adapted to demultiplex downstream signals from said Wireless Access Unit transceiver circuitry and to multiplex upstream signals from Wireless Access Unit interface circuitry for delivery to said Wireless Access Unit transceiver circuitry and compatible for eventual demultiplexing by the multiplex/demultiplex circuitry in said Web Control Unit; and
      iii. said Wireless Access Unit interface circuitry adapted to render downstream signals from said Wireless Access Unit multiplex/demultiplex circuitry compatible for use by subscriber's equipment for delivery to at least one interface to said subscriber's equipment, and to render upstream signals from said at least one subscriber's equipment interface compatible for use by and delivery to said Wireless Access Unit multiplex/demultiplex circuitry.

2. The web according to claim 1 further comprising:
   a. in said Web Control Unit, at least one web digital interface adapted to be connected to the PSTN, said web digital interface adapted to render downstream signals from the PSTN compatible with circuitry in the Web Control Unit, and to render upstream signals from said switch compatible with the PSTN; and
   b. at least one digital Wireless Access Unit, comprising:
      i. transceiver circuitry adapted to receive downstream signals via RF link from said Web Control Unit and to demodulate said downstream signals for delivery to multiplex/demultiplex circuitry, and to modulate upstream signals delivered from said multiplex/ demultiplex circuitry onto at least one RF carrier in order to provide said signals via RF link to said Web Control Unit;
ii. multiplex/demultiplex circuitry adapted to demultiplex downstream signals from said transceiver circuitry and to multiplex upstream signals from interface circuitry for delivery to said transceiver circuitry and compatible for eventual demultiplexing by the multiplex/demultiplex circuitry in said Web Control Unit; and
iii. interface circuitry adapted to render downstream signals from said multiplex/demultiplex circuitry compatible for use by said subscriber's equipment for delivery to at least one interface to said subscriber's equipment, and to render upstream signals from said at least one subscriber's equipment interface compatible for use by and delivery to said multiplex/ demultiplex circuitry.

3. The web according to claim 1 further comprising at least one handset, said handset comprising:
a. transceiver circuitry adapted to receive downstream signals via RF link from said Web Control Unit and to demodulate said downstream signals for delivery to multiplex/demultiplex circuitry, and to modulate upstream signals delivered from said multiplex/ demultiplex circuitry onto at least one RF carrier in order to provide said signals via RF link to said Web Control Unit;
b. multiplex/demultiplex circuitry adapted to demultiplex downstream signals from said transceiver circuitry and to multiplex upstream signals from interface circuitry for delivery to said transceiver circuitry and compatible for eventual demultiplexing by the multiplex/ demultiplex circuitry in said Web Control Unit; and
c. interface circuitry adapted to convert downstream signals from said multiplex/demultiplex circuitry to analog and render said downstream signals compatible for use by at least a loudspeaker in said handset, and to convert upstream signals from a microphone in said handset to digital and render said upstream signals compatible for use by and delivery to said multiplex/ demultiplex circuitry.

4. The web according to claim 1 in which said Web Control Unit is adapted to be programmed from an external source comprising a service bureau.

5. The web according to claim 1 in which said Web Control Unit is adapted to be programmed from an external source comprising a personal computer.

6. The web according to claim 1 in which said Web Control Unit and said Wireless Access Units are adapted to control power level of power radiated by said transceiver circuitry in order to reduce interference among adjacent webs.

7. The web according to claim 3 in which said Web Control Unit, said handsets and said Wireless Access Units are adapted to control power level of power radiated by said transceiver circuitry in order to reduce interference among adjacent webs.

8. The web according to claim 1 in which Web Control Units of different subscribers are adapted to coordinate with one another to control frequency use and power levels in order to avoid mutual interference.

9. The web according to claim 1 in which the Web Control Unit is adapted to connect to a plurality of PSTN analog lines and comprises a plurality of analog interfaces, each interface comprising its own analog/digital conversion circuitry.

10. The web according to claim 1 in which the Web Control Unit is adapted to connect to a plurality of PSTN analog lines and comprises a plurality of analog interfaces, all interfaces sharing a common analog/digital conversion circuitry.

11. A communications web for use by a switched telecommunications infrastructure subscriber, said web comprising:
a. at least one Web Control Unit comprising:
i. a plurality of web analog interfaces, each adapted to be connected to the telecommunications infrastructure, at least some of said interfaces adapted to convert analog signals to digital in a downstream direction and render the signals compatible with circuitry in the Web Control Unit, and to convert digital signals to analog in an upstream direction for delivery to the telecommunications infrastructure and to render the upstream signals compatible with the telecommunications infrastructure;
ii. switching circuitry adapted to couple signals from each of said at least one web analog interfaces to at least one output, in accordance with control signals provided by a programmable controller;
iii. said programmable controller adapted to control said switching circuitry according to the number and types of telecommunications infrastructure connections coupled to said at least one web analog interfaces; the number, types and locations of subscriber's equipment serviced by the communications web; and the desires of the subscriber;
iv. circuitry adapted to modulate and multiplex downstream signals from said switching circuitry onto at least one RF carrier in order to transmit said signals via RF link, and to demodulate and demultiplex upstream signals received via RF link for delivery to said switching circuitry;
b. at least one analog Wireless Access Unit comprising:
i. circuitry adapted to receive downstream signals via RF link from said Web Control Unit and to demodulate and demultiplex said downstream signals for delivery to Wireless Access Unit interface circuitry, and to multiplex and modulate upstream signals delivered from said Wireless Access Unit interface circuitry onto at least one RF carrier in order to provide said upstream signals via RF link to said Web Control Unit;
ii. said Wireless Access Unit interface circuitry adapted to convert downstream signals from said multiplexing and modulation circuitry to analog and render said downstream signals compatible for use by subscriber's equipment for delivery to at least one interface to said subscriber's equipment, and to convert upstream signals from said at least one subscriber's equipment interface to digital and render said upstream signals compatible for use by and delivery to said multiplexing and modulation circuitry;
c. a telephone connected to at least one Wireless Access Unit; and
d. at least one handset comprising:
i. circuitry adapted to receive downstream signals via RF link from said Web Control Unit and to demodulate and demultiplex said downstream signals for delivery to handset interface circuitry, and to multiplex and modulate upstream signals from said handset interface circuitry onto at least one RF carrier in order to transport said signals via RF link to said Web Control Unit;

ii. said handset interface circuitry adapted to convert downstream signals from said multiplexing and modulation circuitry to analog and render said downstream signals compatible for use by at least a loudspeaker in said handset, and to convert upstream signals from a microphone in said handset to digital and render said upstream signals compatible for use by and delivery to said multiplexing and modulation circuitry.

12. The communications web according to claim 11 further comprising at least one digital Wireless Access Unit, comprising:

i. circuitry adapted to receive downstream signals via RF link from said Web Control Unit and to demodulate and demultiplex said downstream signals for delivery to interface circuitry, and to modulate upstream signals from said interface circuitry onto at least one RF carrier in order to provide said signals via RF link to said Web Control Unit; and ii. interface circuitry adapted to render downstream signals from said multiplexing and modulation circuitry compatible for use by subscriber's equipment for delivery to at least one interface to said subscriber's equipment, and to render upstream signals from said at least one interface compatible for use by and delivery to said multiplexing and modulation circuitry.

13. The communications web according to claim 11 in which said modulation circuitry in said Web Control Unit is adapted to monitor emissions from other communications webs and vary its output power level and operating frequency accordingly.

14. The communications web according to claim 13 further comprising routing circuitry in said Web Control Unit adapted to connect communications among at least two of the group comprising said Wireless Access Units of said web, handsets and incoming lines connected to said Web Control Unit.

15. The communications web according to claim 11 further comprising an accessory module comprising:

a. circuitry adapted to receive downstream signals via RF link from said Web Control Unit and to demodulate and demultiplex said downstream signals for delivery to interface circuitry, and to modulate upstream signals from said interface circuitry onto at least one RF carrier in order to provide said signals via RF link to said Web Control Unit; and b. interface circuitry adapted to render downstream signals from said multiplexing and modulation circuitry compatible for use by said subscriber's equipment for delivery to at least one interface to said subscriber's equipment, and to render upstream signals from said at least one interface compatible for use by and delivery to said multiplexing and modulation circuitry;

c. said subscriber's equipment adapted to detect at least one condition in subscriber's residence and generate electronic signals corresponding to said at least one condition.

16. A process for connecting a plurality of lines of the public switched telecommunications network (PSTN) to subscriber equipment comprising:

a. converting analog signals on a plurality of said PSTN lines to digital signals;

b. providing said digital signals to a switch adapted to couple signals from said PSTN lines to at least one output;

c. programming said switch to couple each of said PSTN line signals to a desired output in the switch, said programming conducted according to: (1) the number of and nature of each of said PSTN lines; (2) the types of said subscriber equipment; and (3) the subscriber's preferences;

d. multiplexing said output signals from said switch to create a multiplexed signal;

e. modulating said multiplexed signal onto at least one radiofrequency signal for transmission of said multiplexed signal via radiofrequency link; and f. in at least one of a plurality of remote units,
  i. receiving said radiofrequency signal;
  ii. demodulating and demultiplexing said signal;
  iii. identifying portions of said demodulated signal intended for said at least one remote unit, said portions corresponding to signals on a PSTN line programmed in said switch to be connected to subscriber equipment connected to said at least one remote unit;
  iii. selecting said portions which have been identified and converting said identified portions to analog; and
  iv. providing said analog signal to subscriber equipment connected to said at least one remote unit.

17. The process according to claim 16 further comprising:

a. in each of said remote units:
  i. digitizing signals received from said subscriber equipment;
  ii. multiplexing and modulating said signals for transmission via radiofrequency link;

b. receiving said transmitted signals from said plurality of remote units in multiplexed format;

c. demodulating and demultiplexing said signals for input to said switch;

d. coupling, in said switch, each of said demultiplexed signals to a PSTN line programmed in said switch to correspond to subscriber equipment from which information on each of said demultiplexed signals originated.

18. The process according to claim 16 in which programming the switch is conducted via the PSTN.

19. The process according to claim 16 in which programming the switch is performed on a computer.

20. The process according to claim 16 in which modulating said multiplexed signal onto at least one radiofrequency signal for transmission of said multiplexed signal via radiofrequency link further comprises:

a. sensing emissions from other communications webs; and b. varying the power level and frequency of said transmission according to said emissions.

21. The process according to claim 16 further comprising conducting signaling for transmission on the PSTN.

* * * * *